US012767895B2

(12) United States Patent
Wang et al.

(10) Patent No.: US 12,767,895 B2
(45) Date of Patent: Oct. 20, 2026

(54) HEAT RECOVERY APPARATUS FOR CRACKED GAS AND HEAT RECOVERY PROCESS FOR CRACKED GAS

(71) Applicants: CHINA PETROLEUM & CHEMICAL CORPORATION, Beijing (CN); SINOPEC ENGINEERING INCORPORATION, Beijing (CN)

(72) Inventors: Zhenwei Wang, Beijing (CN); Liqing Yang, Beijing (CN); Bairen Zhao, Beijing (CN); Mingrui Zhao, Beijing (CN); Gang Liu, Beijing (CN)

(73) Assignees: CHINA PETROLEUM & CHEMICAL CORPORATION, Beijing (CN); SINOPEC ENGINEERING INCORPORATION, Beijing (CN)

( * ) Notice: Subject to any disclaimer, the term of this patent is extended or adjusted under 35 U.S.C. 154(b) by 409 days.

(21) Appl. No.: 18/263,888

(22) PCT Filed: Jan. 27, 2022

(86) PCT No.: PCT/CN2022/074232
§ 371 (c)(1),
(2) Date: Aug. 1, 2023

(87) PCT Pub. No.: WO2022/166740
PCT Pub. Date: Aug. 11, 2022

(65) Prior Publication Data
US 2024/0084203 A1 Mar. 14, 2024

(30) Foreign Application Priority Data
Feb. 2, 2021 (CN) ......................... 202110142616.2
Feb. 2, 2021 (CN) ......................... 202110143213.X
(Continued)

(51) Int. Cl.
*C10G 9/00* (2006.01)
*B01D 3/00* (2006.01)
(Continued)

(52) U.S. Cl.
CPC ............. *C10G 9/002* (2013.01); *B01D 3/007* (2013.01); *B01D 3/141* (2013.01); *B01J 4/008* (2013.01);
(Continued)

(58) Field of Classification Search
CPC . C10G 5/06; C10G 7/00; C10G 9/002; C10G 2400/02; B01D 3/007; B01D 3/141;
(Continued)

(56) References Cited

U.S. PATENT DOCUMENTS 3,923,921 A * 12/1975 Kohfeldt ................ C10G 9/002 208/100
5,877,380 A 3/1999 Conroy et al.
(Continued)

FOREIGN PATENT DOCUMENTS

CN 101358143 A 2/2009
CN 101376068 A 3/2009
(Continued)

OTHER PUBLICATIONS

CN-111094518 Translation (Year: 2020).*
(Continued)

*Primary Examiner* — Prem C Singh
*Assistant Examiner* — Brandi M Doyle
(74) *Attorney, Agent, or Firm* — NKL Law; Allen Xue

(57) ABSTRACT

A heat recovery apparatus and process for cracked gas are provided. The cracked gas comprises liquid feedstock cracked gas and gaseous feedstock cracked gas, and the apparatus comprises a heat recovery device for liquid feedstock cracked gas, a heat recovery device for gaseous
(Continued)

feedstock cracked gas and a heavy component removal unit. The invention solves the problems in the art, i.e., incomplete heat recovery technology for cracked gas, insufficient control of viscosity of quench oil, high capital investment and large footprint of the equipment, as well as unstable operation and high energy consumption.

30 Claims, 9 Drawing Sheets

(30) Foreign Application Priority Data

Feb. 2, 2021 (CN) ......................... 202110143235.6
Feb. 2, 2021 (CN) ......................... 202110143244.5

(51) Int. Cl.

| | |
|---|---|
| ***B01D 3/14*** | (2006.01) |
| ***B01J 4/00*** | (2006.01) |
| ***B01J 19/00*** | (2006.01) |
| ***C10G 5/06*** | (2006.01) |
| ***C10G 7/00*** | (2006.01) |
| ***F27D 17/25*** | (2025.01) |

(52) U.S. Cl.
CPC ............ *B01J 19/0013* (2013.01); *C10G 5/06* (2013.01); *C10G 7/00* (2013.01); *F27D 17/25* (2025.01); *B01J 2204/007* (2013.01); *B01J 2219/00103* (2013.01); *C10G 2400/02* (2013.01)

(58) Field of Classification Search
CPC .. B01D 3/143; F22B 1/18; F27D 17/00; B01J 4/008; B01J 19/0013; B01J 2204/007; B01J 2219/00103
See application file for complete search history.

(56) References Cited

U.S. PATENT DOCUMENTS

| | | | | |
|---|---|---|---|---|
| 2011/0226607 | A1 | 9/2011 | Anderson et al. | |
| 2017/0204336 | A1 | 7/2017 | Bhatia | |
| 2021/0139620 | A1 * | 5/2021 | Slivensky | C07C 5/48 |

FOREIGN PATENT DOCUMENTS

| | | | | | |
|---|---|---|---|---|---|
| CN | 101962564 | A | | 2/2011 | |
| CN | 102911716 | A | | 2/2013 | |
| CN | 104673353 | A | | 6/2015 | |
| CN | 105135396 | A | | 12/2015 | |
| CN | 105566029 | A | | 5/2016 | |
| CN | 105567292 | A | | 5/2016 | |
| CN | 105567294 | A | | 5/2016 | |
| CN | 109021999 | A | | 12/2018 | |
| CN | 109486512 | A | | 3/2019 | |
| CN | 109678635 | A | | 4/2019 | |
| CN | 111094518 | A | * | 5/2020 | C10G 9/002 |
| DE | 3433863 | A | * | 3/1986 | |
| WO | 2007008423 | A1 | | 1/2007 | |
| WO | WO-2021016306 | A1 | * | 1/2021 | C10G 51/023 |
| WO | WO-2025009987 | A1 | * | 1/2025 | C10G 9/002 |

OTHER PUBLICATIONS

DE 3433863 Translation (Year: 1986).*
Lei, Zhengxiang; "Process Design for Reforming the Quenching System of Ethylene Plant"; Petrochemical Design; vol. 32, No. 2; Year: 2015; pp. 6-9, and 12.
Xu, Bin et al.; "Simulation and comparison of gasoline fractionation tower in ethylene unit"; Modern Chemical Industry; vol. 24, No. 11; Nov. 2004; pp. 52-55.
Yang, Chunsheng; "The Design of Quenching Oil System for Ethylene Plants and Technical Revamping Aimed at Raising Energy Efficiency"; Sino-Global Energy; vol. 16, No. 1; Jan. 2011; pp. 106-111.
Han, Huijun et al.; "Analysis of process characteristic of ethylene plant waste heat recovery"; Refining and Chemical Industry; vol. 28, No. 3; Year: 2017; pp. 20-22.

* cited by examiner

HEAT RECOVERY APPARATUS FOR CRACKED GAS AND HEAT RECOVERY PROCESS FOR CRACKED GAS

TECHNICAL FIELD

The invention relates to the field of ethylene production, more specifically to a heat recovery apparatus for cracked gas, a heat recovery process for cracked gas, and a fractionating column.

BACKGROUND ART

Feedstocks to be cracked in ethylene plant comprise naphtha, gas oil, hydrogenated tail oil, ethane, propane, liquefied petroleum gas (LPG) and other petrochemical feedstocks. Feedstocks to be cracked may be classified into liquid feedstocks and gaseous feedstocks. Liquid feedstock cracked gas is obtained by cracking the liquid feedstock in a liquid feedstock cracker, wherein the liquid feedstock may be selected from one or more of C5 and higher light hydrocarbons, naphtha, gas oil and hydrogenated tail oil. Gaseous feedstock cracked gas is obtained by cracking the gaseous feedstock in a gaseous feedstock cracker, and the gaseous feedstock may be selected from one or more of ethane, propane, butane, refinery dry gas and LPG. The energy consumption of cracking process accounts for 50-60% of the whole plant, and thus the recovery of high-temperature waste heat from cracked gas is of great significance for energy saving and consumption reduction of ethylene plant.

Increased bottom temperature of the fractionating column contributes to increased amount of dilution steam generated by quench oil so that the consumption of medium pressure steam may be reduced; but meanwhile, the increased content of heavy components in quench oil leads to increasingly high viscosity of quench oil, which deteriorates the operation state of quench oil heat exchange device, resulting in a serious shortage of dilution steam generated by quench oil, therefore requiring increased amount of medium pressure steam as supplement, and consequently adversely affecting the stable operation and energy saving and consumption reduction of the ethylene plant. Therefore, the heavy components in cracked gas and quench oil need to be removed. In addition, compared to the gaseous feedstock cracked gas, the liquid feedstock cracked gas typically contains more heavy components and solid coke particles, which will cause equipment blockage in the quench system and affect the normal operation of the plant.

In the traditional process, the cracked gas is firstly transferred to a waste heat boiler for recovering high-grade heat energy and producing by-product super high pressure steam. The liquid feedstock cracked gas after being used for producing super high pressure steam may generally have a temperature of 400-480° C., and a part of gaseous feedstock cracked gas after being used for producing super high pressure steam may generally have a temperature of 350-380° C., which are then cooled by sprayed quench oil to reduce the temperature of the cracked gas to 200-250° C. and then sent to the fractionating column. The other part of the gaseous feedstock cracked gas, after passing through the waste heat boiler, is still at a higher temperature, generally 480-520° C., so that it may have enough heat to vaporize the intermediate components in the sprayed quench oil and return them to the fractionating column together with the cracked gas. The non-vaporized heavy components in liquid phase are discharged so that the quench oil may be maintained at a viscosity within a reasonable range.

The two streams of the gaseous feedstock cracked gas, after passing through the quench boiler, are both at relatively high temperatures, implying that the heat recovery of the traditional process is insufficient. On the other hand, because only a small part of the quench oil is subjected to heavy component removal by contacting with the gaseous feedstock cracked gas, only a little partial removal of heavy components can be achieved, and the bottom temperature of the quench oil column is still relatively low.

In addition, all of the cracked gases need to pass through the gasoline fractionating column, requiring a large diameter of the gasoline fractionating column and bringing about great challenges to equipment manufacturing and transportation. The current transportation capability generally requires that the column diameter should not exceed 13.5 m, otherwise it is difficult to realize on-site transportation.

In the traditional ethylene plant, the liquid feedstock cracked gas, after being subjected to heat recovery in a waste heat boiler, cooled in a quench fitting by sprayed quench oil, and mixed with the gaseous feedstock cracked gas that has been subjected to heat recovery in a waste heat boiler, is fed to the quench oil section configured at the lower part of the gasoline fractionating column. During such processes, the gaseous feedstock cracked gas after heat recovery in the waste heat boiler (gas phase, temperature of about 200° C.) contains less quantity of coke particles and heavy components, while the liquid feedstock cracked gas, after heat recovery in the waste heat boiler and cooled in the quench fitting by sprayed quench oil, becomes two phases at about 400° C. and contains a significant amount of coke particles and heavy components. The two streams differ remarkably from each other in physical properties, and the mixed treatment of them is economically unreasonable due to artificially increased separation load.

In the traditional ethylene plant, the quench oil section of the gasoline fractionating column is configured with herringbone baffle or angle steel for removing the coke particles entrained in the cracked gas, and the quench oil is extracted from the bottom of the quench oil section of the gasoline fractionating column and contains a significant amount of heavy components and coke particles. For removing the coke particles in the quench oil, it is generally necessary to dispose a filter in front of the quench oil circulating pump and a cyclone hydraulic separator and a quiescent device behind of the quench oil circulating pump, which involves higher capital investment, a large number of equipment and footprint requirements.

In addition, the traditional ethylene plant generally needs a separately arranged viscosity reduction column for quench oil to isolate the heavy components, reduce its viscosity and increase its temperature, wherein high temperature gaseous feedstock cracked gas (at a temperature of 450-505° C.) and high pressure steam are used as stripping mediums and a part of quench oil is introduced into the viscosity reduction column for stripping, with heavy components removed from the column bottom and desired middle fraction returned to the gasoline fractionating column. Since the viscosity reduction column is generally designed to be operated at about 250-280° C., and the high temperature gaseous feedstock cracked gas transfers its heat to quench oil of only about 180-200° C., the utilization of the heat is insufficiently economical. Furthermore, in practical operation, since the viscosity reduction column is highly prone to blockage at the bottom by the heavy components at high temperature, it is generally operated at a temperature far below its designed temperature, which leads to poor viscosity reduction effect. Consequently, the operation temperature of the quench oil is involuntarily reduced for avoiding the quench oil from auto-polymerization. Thus, the bottom of the gasoline fractionating column takes less heat and the heat goes up to increase the top temperature of column, which may lead to emulsification of the quench water in the downstream quench water column and adversely affect the stable operation of the ethylene plant. In addition, since the quench oil is used as heat source for generating dilution steam, decreased temperature of the quench oil results in less amount of dilution steam generated, which means more medium pressure steam is required to generate dilution steam, leading to increased energy consumption of ethylene plant.

Therefore, how to better recover and sufficiently utilize the heat of cracked gas and how to achieve coke particle removal and quench oil viscosity reduction as well as reduced column diameter of the gasoline fractionating column are still urgent technical problems to be solved.

SUMMARY OF THE INVENTION

In order to solve the problems in the prior art, such as incomplete technology of heat recovery for cracked gas, insufficient control on quench oil viscosity, high capital investment and operation cost of the equipment, the present inventor develops a heat recovery apparatus for cracked gas and a heat recovery process for cracked gas, which can realize recovery of high-grade heat from the cracked gas as much as possible in a heat recovery device and generate as much super high pressure steam as possible; and additionally achieve effective control on the quench oil viscosity by removing the heavy components in the liquid feedstock cracked gas, and thereby improving the bottom temperature of fractionating column and maximizing the heat recovery from high-temperature cracked gas. In sum, the present invention may be of important and far-reaching significance for the stable operation and energy saving and consumption reduction of ethylene plant.

In order to achieve the above purposes, the first aspect of the invention provides a heat recovery apparatus for cracked gas, comprising a heat recovery device for liquid feedstock cracked gas, a heat recovery device for gaseous feedstock cracked gas and a heavy component removal unit. The heat recovery device for liquid feedstock cracked gas is connected to the discharge port of the liquid feedstock cracker, the heat recovery device for gaseous feedstock cracked gas is connected to the discharge port of the gaseous feedstock cracker, and the heavy component removal unit comprises at least a first part for removing colloids, asphaltenes and solid coke particles, and a second part for removing intermediate components above 205° C. by fractionation. The discharge pipeline of the heat recovery device for liquid feedstock cracked gas is connected to the first part of the heavy component removal unit, and the discharge pipeline of the heat recovery device for gaseous feedstock cracked gas is connected to the heavy component removal unit. The second part of the heavy component removal unit is configured at its bottom with a discharge pipeline for quench oil. The discharge pipeline for quench oil is connected in succession with a quench oil pump and a quench oil heat recovery device, and then divided into two branches, wherein the first branch is connected to the second part of the heavy component removal unit, and the second branch is connected to the discharge pipeline of the heat recovery device liquid feedstock cracked gas or to the first part of the heavy component removal unit.

The second aspect of the invention provides a heat recovery process for cracked gas, comprising: cooling a liquid feedstock cracked gas originated from a liquid feedstock cracker in a heat recovery device for liquid feedstock cracked gas to a temperature T1, to obtain a liquid feedstock cracked gas after heat recovery, which then is supplied to the first part of a heavy component removal unit for removing colloids, asphaltenes and solid coke particles; further cooling the liquid feedstock cracked gas after heat recovery, before or after being supplied to the first part of the heavy component removal unit, to a temperature T2 by mixing with quench oil; supplying the gas phase from the first part of the heavy component removal unit to the second part of the heavy component removal unit to remove intermediate components above 205° C. by fractionation, extracting the liquid heavy component fuel oil carrying with solid particles from the first part of the heavy component removal unit, to realize heavy component removal of the liquid feedstock cracked gas; cooling the gaseous feedstock cracked gas originated from the gaseous feedstock cracker in the heat recovery device for gaseous feedstock cracked gas to a temperature T3, and supplying the gaseous feedstock cracked gas after heat recovery to the heavy component removal unit; further cooling the overhead gas phase from the first part of the heavy component removal unit and the gaseous feedstock cracked gas after heat recovery in the second part of the heavy component removal unit, wherein some components condense into liquid quench oil, and extracting the quench oil at the bottom of the second part of the heavy component removal unit by the quench oil pump and subjecting it to heat recovery in a quench oil heat recovery device. The quench oil after heat recovery is divided into two streams, with the first stream returned to the second part of the heavy component removal unit, and the second stream mixed with the liquid feedstock cracked gas after heat recovery. The uncondensed components are the overhead gas phase of the second part of the heavy component removal unit.

The heat recovery apparatus for cracked gas and the heat recovery process for cracked gas according to the present invention are of important and far-reaching significance for the stable operation and energy saving and consumption reduction of the ethylene plant. Specifically, the device and process have the following advantages:

1) By adopting a heavy component removal unit comprising at least the first part and the second part, the high viscosity heavy components such as colloids and asphaltenes, as well as solid coke particles, can be effectively removed, so that the viscosity of quench oil and consequently the power consumption of the quench oil pump may be reduced;
2) By recovering high-grade heat from the cracked gas as much as possible in the heat recovery device, the recovery of waste heat from high-temperature cracked gas may be maximized;
3) By distributing streams after heat recovery, according to their different dew points of cracked gases from liquid and gaseous feedstocks, respectively to the fractionating column and the quench water column, the diameter of the fractionating column may be significantly reduced.

Other features and advantages of the invention will be described in detail in the following specific embodiments.

BRIEF INTRODUCTION OF THE DRAWINGS

FIG. 1*a* and FIG. 1*b* are flow charts of the first embodiment of the present invention for recovering heat from cracked gas.

LIST OF REFERENCE MARKINGS

Figure 1A:
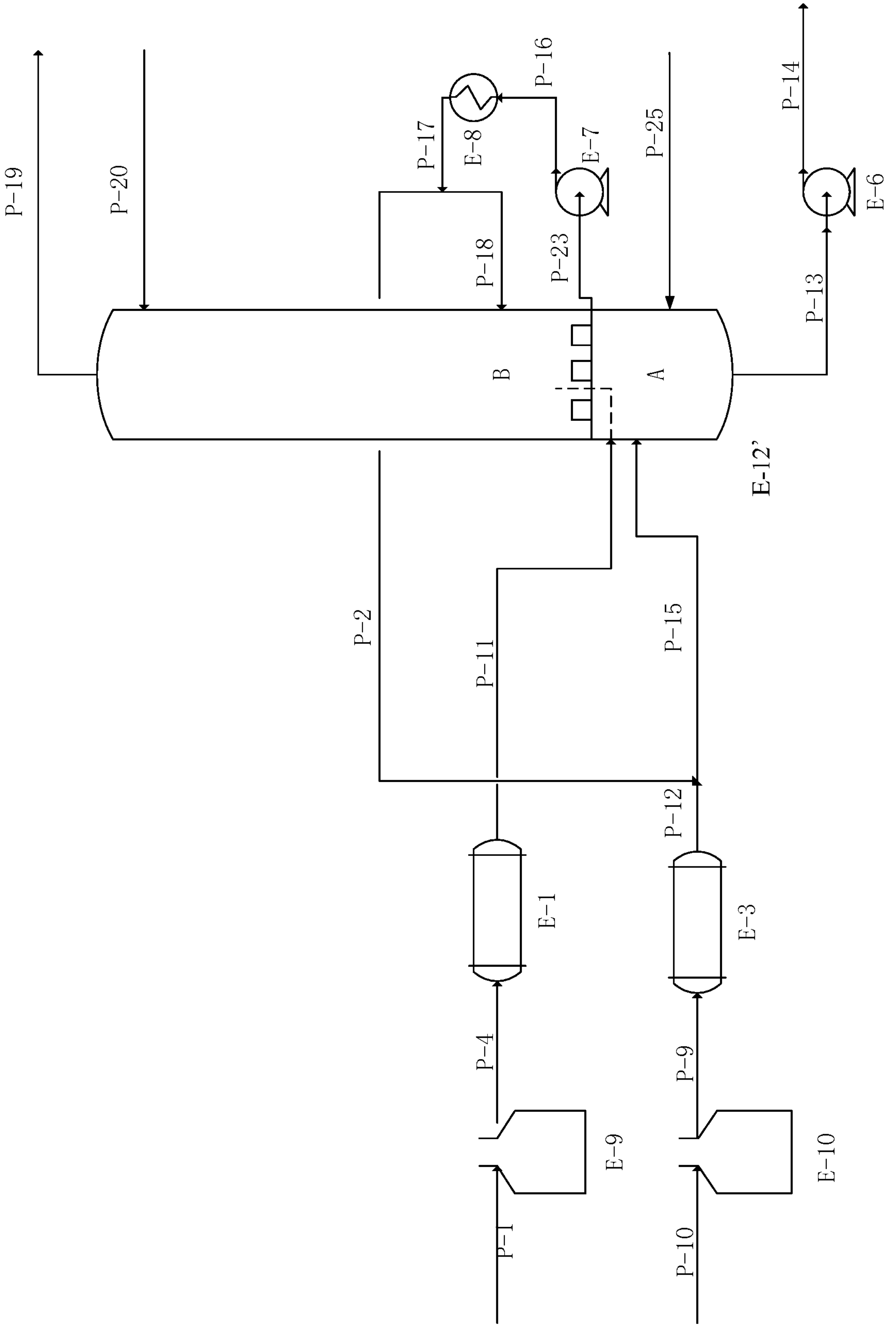

P-1 gaseous feedstock
P-2 quench oil to be mixed with liquid feedstock cracked gas after cooling
P-4 gaseous feedstock cracked gas
P-6, P-11 gaseous feedstock cracked gas after heat recovery
P-9 liquid feedstock cracked gas
P-10 liquid feedstock
P-12 liquid feedstock cracked gas after heat recovery
P-13 liquid heavy component fuel oil
P-14 discharged liquid heavy component fuel oil
P-15 liquid feedstock cracked gas mixed with quench oil
P-16 quench oil after boosting
P-17 quench oil after cooling
P-18 quench oil returned to second part of heavy component removal unit
P-19 overhead cracked gas of gasoline fractionating column
P-20 reflux gasoline
P-23 quench oil
P-24 overhead gas phase of heavy component removal column
P-25 steam
P-26 quench water
P-27 quench water after primary quench water cooler
P-28 quench water after secondary quench water cooler
P-29 overhead cracked gas of quench water column
E-1 heat recovery device for gaseous feedstock cracked gas
E-3 heat recovery device for liquid feedstock cracked gas
E-5 reflux gasoline pump
E-6 pyrolysis fuel oil pump
E-7 quench oil pump
E-8 quench oil heat recovery device
E-9 gaseous feedstock cracker
E-10 liquid feedstock cracker
E-11 heavy component removal column
E-12 gasoline fractionating column
E-12' fractionating column
E-13 first quench water cooler
E-14 second quench water cooler
E-15 quench water heat recovery device
E-16 quench water column

DETAILED DESCRIPTION OF THE INVENTION

Preferred embodiments of the present invention will be described in more detail below. Although preferred embodiments of the invention are described below, it should be understood that the invention can be implemented in various forms and should not be limited to the embodiments set forth herein.

The heat recovery apparatus for cracked gas of the invention comprises a heat recovery device for liquid feedstock cracked gas E-3, a heat recovery device for gaseous feedstock cracked gas E-1 and a heavy component removal device, wherein the heat recovery device for liquid feedstock cracked gas E-3 is connected to the discharge port of the liquid feedstock cracker E-10; the heat recovery device for gaseous feedstock cracked gas E-1 is connected to the discharge port of the gaseous feedstock cracker E-9; the discharge pipeline of the heat recovery device for liquid feedstock cracked gas E-3 is connected to the first part of the heavy component removal unit; the discharge pipeline of the heat recovery device for gaseous feedstock cracked gas E-1 is connected to the heavy component removal unit; a discharge pipeline for quench oil is configured at the bottom of the second part of the heavy component removal unit, which is connected in succession with a quench oil pump E-7 and a quench oil heat recovery device E-8, and then divided into two branches, wherein the first branch is connected to the second part of the heavy component removal unit, and the second branch is connected to the discharge pipeline of the heat recovery device for liquid feedstock cracked gas E3 or to the first part of the heavy component removal unit.

In one embodiment, the heavy component removal unit may comprise a heavy component removal column E-11 and a gasoline fractionating column E-12, wherein the heavy component removal column E-11 constitutes the first part of the heavy component removal unit, and the gasoline fractionating column E-12 constitutes the second part of the heavy component removal unit. The heavy component removal column E-11 can be configured with a discharge pipeline at the top and a discharge pipeline for liquid-solid heavy component fuel oil at the bottom. The heavy component removal column E-11 can be connected to the gasoline fractionating column E-12 via the top discharge pipeline of the heavy component removal column; the gasoline fractionating column E-12 is configured with a discharge pipeline for quench oil at the bottom and a discharge pipeline for gas phase at the top.

In another embodiment, the heavy component removal unit may comprise a fractionating column E-12', and the fractionating column E-12' may be divided by a partition plate into an upper part and a lower part, with the two parts in gas communication, respectively named as the lower A section and the upper B section, wherein the lower A section constitutes the first part of the heavy component removal unit, and the upper B section constitutes the second part of the heavy component removal unit. The fractionating column E-12' can be configured with a discharge pipeline for gas phase at the top and a discharge pipeline for liquid-solid phase at the bottom. The fractionating column E-12' may be further configured with a discharge pipeline for quench oil at the bottom of upper B section.

The first part of the heavy component removal unit can remove colloids, asphaltenes and solid coke particles, for example, by flash evaporation or cyclone separation. The second part of the heavy component removal unit can remove intermediate components above 205° C. by fractionation.

The heavy component removal unit can also comprise a quench water column E-16, which constitutes the third part of the heavy component removal unit. The discharge pipeline of the heat recovery device for gaseous feedstock cracked gas E-1 can be connected to the quench water column E-16. The discharge pipeline for gas phase at the top of the gasoline fractionating column E-12 or the fractionating column E-12' can be connected to the quench water column E-16. The quench water column E-16 can be configured at the top with a discharge pipeline and at the bottom with an extraction pipeline for heavy oil and an extraction pipeline for gasoline for gasoline.

The extraction pipeline for gasoline can be configured at a higher position at the bottom of the quench water column E-16, and, after connected with the reflux gasoline pump E-5, is divided into two branches respectively connected to the top of the second part of the heavy oil removal unit and to a downstream stripping device. The quench water column E-16 can further be configured with a discharge pipeline for process water and a discharge pipeline for quench water, wherein the discharge pipeline for quench water can be connected to at least one-stage heat recovery device and at least one-stage quench water cooler and then respectively connected to the top and middle of the quench water column E-16.

The discharge pipeline of the heat recovery device for gaseous feedstock cracked gas E-1 can be connected to the gasoline fractionating column E-12.

The discharge pipeline of the heat recovery device for gaseous feedstock cracked gas E-1 can also be connected to the lower A section or the upper B section of the fractionating column E-12'.

The second branch can be connected to the discharge pipeline of the heat recovery device for liquid feedstock cracked gas E-3, so that the quench oil and the discharge of the heat recovery device for liquid feedstock cracked gas E-3 are mixed in the pipeline.

The second branch can also be connected to the upper part of the heavy component removal column E-11, and the discharge pipeline of the heat recovery device for liquid feedstock cracked gas E-3 can be connected to the lower part of the heavy component removal column E-11.

The second branch can also be connected to the top of the lower A section of the fractionating column E-12', and the discharge pipeline of the heat recovery device for liquid feedstock cracked gas E-3 can be connected to the bottom of the lower A section of the fractionating column E-12'.

The lower part of the heavy component removal column E-11 can be configured with a feed pipeline for steam. The heavy component removal column E-11 can be provided with internals, preferably at least one of distributor, grid, wire mesh and spray nozzle. The gasoline fractionating column E-12 can be provided with internals, which are preferably trays, packings or a combination thereof. The gasoline fractionating column E-12 can be divided into 2 to 4 subsections, preferably comprising, in order of from bottom to top, a quench oil section, a pan oil section and a rectification section.

The lower A section of the fractionating column E-12' can be configured at its lower part with a feed pipeline for steam and can be provided with internals, preferably at least one of distributor, grid, wire mesh and spray nozzle. The upper B section of fractionating column E-12' can be provided with internals, which are preferably trays, packings or a combination thereof. The upper B section of fractionating column E-12' can be divided into 2 to 4 subsections, preferably comprising, in order of from bottom to top, a quench oil section, a pan oil section and a rectification section.

The pipeline connecting the heat recovery device for gaseous feedstock cracked gas E-1 and the heavy component removal unit may be configured with coke removal device, which may be at least one of a coke removal drum, a single cyclone separator and a combination of a plurality of cyclones.

The heat recovery process for cracked gas of the invention comprises: cooling the liquid feedstock cracked gas P-9 originated from the liquid feedstock cracker E-10 in the heat recovery device for liquid feedstock cracked gas E-3 to a temperature T1, to obtain a liquid feedstock cracked gas after heat recovery P-12, which then is supplied to the first part of the heavy component removal unit; further cooling the liquid feedstock cracked gas after heat recovery P-12, before or after being supplied to the first part of the heavy component removal unit, to a temperature T2 by mixing with quench oil; supplying the gas phase from the first part of the heavy component removal unit to the second part of the heavy component removal unit for further cooling, and extracting the liquid heavy component fuel oil P-13 carrying with solid particles from the first part of the heavy component removal unit, so as to realize heavy component removal of the liquid feedstock cracked gas; cooling the gaseous feedstock cracked gas P-4 originated from the gaseous feedstock cracker E-9 supplied to the heat recovery device for gaseous feedstock cracked gas E-1 to a temperature T3, and supplying the gaseous feedstock cracked gas after heat recovery P-6, P-11 to the heavy component removal unit; further cooling the overhead gas phase from the first part of the heavy component removal unit and the gaseous feedstock cracked gas after heat recovery P-6, P-11 in the second part of the heavy component removal unit, wherein some components condense into liquid quench oil, and extracting the quench oil P-23 at the bottom of the second part of the heavy component removal unit by the quench oil pump E-7 and subjecting it to heat recovery in the quench oil heat recovery device E-8. The quench oil after heat recovery P-17 is divided into two streams, wherein the first quench oil stream P-18 is returned to the second part of the heavy component removal unit, and the second quench oil stream P-2 is mixed with the liquid feedstock cracked gas after heat recovery P-12. The uncondensed components are the overhead gas phase P-19 of the second part of the heavy component removal unit.

In one embodiment, the heavy component removal unit may comprise a heavy component removal column E-11 and a gasoline fractionating column E-12, wherein the heavy component removal column E-11 constitutes the first part of the heavy component removal unit, and the gasoline fractionating column E-12 constitutes the second part of the heavy component removal unit. The overhead gas phase of heavy component removal column E-11 can be supplied to the gasoline fractionating column E-12 for further cooling, and the liquid heavy component fuel oil P-13 carrying with solid particles can be extracted from the bottom of the heavy component removal column E-11.

In another embodiment, the heavy component removal unit may comprise a fractionating column E-12', and the fractionating column E-12' may be divided by a partition plate into an upper part and a lower part, with the two parts in gas communication, respectively named as the lower A section and the upper B section, wherein the lower A section constitutes the first part of the heavy component removal unit, and the upper B section constitutes the second part of the heavy component removal unit. The gas phase separated from the lower A section of the fractionating column E-12' may pass through the partition plate and to the upper B section for further cooling, and the liquid heavy component fuel oil P-13 carrying with solid particles can be extracted from the bottom of the lower A section of the fractionating column E-12'.

The gaseous feedstock cracked gas after heat recovery P-6 can be supplied to the quench water column E-16; and the overhead gas phase P-19 of the second part of the heavy component removal unit and the gaseous feedstock cracked gas after heat recovery P-6 may be mixed with quench water in the quench water column E-16 for further cooling, with light components discharged from the top and heavy components condensed into gasoline that is lighter than water and heavy oil that is heavier than water.

Gasoline can be extracted at a higher position at the bottom of the quench water column E-16, boosted by the reflux gasoline pump E5, and divided into two streams, supplied respectively to the top of the second part of the heavy component removal unit as reflux gasoline P-20 and to a downstream stripping device. Heavy oil can be extracted after oil-water separation in the sump at the bottom of the quench water column E-16, and process water can be separated from the bottom of the quench water column E-16 and supplied to a downstream dilution steam generation system. Quench water P-26 can be separated from the bottom of the quench water column E-16 and, after multiple stages of heat recovery, returned respectively to the top and middle of the quench water column E-16.

The gaseous feedstock cracked gas after heat recovery P-11 may be supplied to the gasoline fractionating column E-12.

The gaseous feedstock cracked gas after heat recovery P-11 may also be directly supplied to the upper B section of the fractionating column E-12', or supplied firstly to the lower A section of the fractionating column E-12' and then to the upper B section through the partition plate.

The second stream of the quench oil P-2 with the liquid feedstock cracked gas after heat recovery P-12 may be mixed in the pipeline.

The liquid feedstock cracked gas after heat recovery P-12 may be supplied to the bottom of the heavy component removal column E-11, and the second stream of the quench oil P-2 may be supplied to the top of the heavy component removal column E-11. That is, the liquid feedstock cracked gas after heat recovery P-12 may be in countercurrent contact with the second stream of the quench oil P-2, so that the liquid feedstock cracked gas after heat recovery P-12 may be further cooled to a temperature T2 and then supplied to the bottom of the gasoline fractionating column E-12.

The liquid feedstock cracked gas after heat recovery P-12 may also be supplied to the bottom of the lower A section of fractionating column E-12', and the second stream of the quench oil P-2 may be supplied to the top of the lower A section of fractionating column E-12'. Within the lower A section of fractionating column E-12', the liquid feedstock cracked gas after heat recovery P-12 may be in countercurrent contact with the second stream of quench oil P-2, so that the liquid feedstock cracked gas after heat recovery P-12 may be further cooled to a temperature T2 and then supplied to the bottom of the upper B section of fractionating column E-11.

Cracking feedstocks can comprise liquid feedstock and gaseous feedstock, wherein the liquid feedstock cracked gas P-9 may be obtained by cracking the liquid feedstock P-10 in the liquid feedstock cracker E-10, and the gaseous feedstock cracked gas P-4 may be obtained by cracking the gaseous feedstock P-1 in the gaseous feedstock cracker E-9.

The temperature T1 may be controlled to be not lower than the dew point, generally with a certain margin, so as to maximize the heat recovery under the premise of avoiding condensation and coking of the heavy components. The value of T1 varies according to different feedstocks, and generally in the range of 300-500° C. The temperature T2 may be controlled to be within a certain range to ensure the maximum removal of the heavy components in the heavy component removal column E-11 or the lower A section of the fractionating column E-12'. The value of T2 varies according to different feedstocks, and generally in the range of 200-350° C., preferably 250-280° C. The temperature T3 may be controlled to be not lower than the dew point, generally with a certain margin, so as to maximize the heat recovery under the premise of avoiding the condensation and coking of the heavy components. The value of T3 varies according to different feedstocks, and generally in the range of 160-240° C.

The heat recovery device for gaseous feedstock cracked gas E-1 and the heat recovery device for liquid feedstock cracked gas E-3 may conduct heat recovery by generating steam. The generated steam may have a pressure in the range of 3.5-13.0 MpaG, preferably 10.0-12.0 MpaG. The heat recovery device for gaseous feedstock cracked gas E-1 and the heat recovery device for liquid feedstock cracked gas E-3 may independently be a one-stage heat recovery device, a multi-stage heat recovery device in series, or a multi-stage heat recovery device in parallel.

Steam P-25 may be introduced to the lower part of the heavy component removal column E-11 or the lower part of the lower A section of the fractionating column E-12' as stripping medium, and the pressure of steam is preferably at the level of 1.2-13.0 MpaG, more preferably 3.5-10.0 MpaG.

The fractionating column E-12' may be configured with overhead reflux.

The process of the present invention can increase the bottom temperature of the fractionating column E-12' by 3-8° C.

EXAMPLES

The invention is further described below in conjunction with the accompanying drawings and examples. It should be understood that the specific embodiments described herein are only for the purpose of illustrating and interpreting the invention and are not intended to limit the invention.

In the following examples and Comparative examples, the gaseous feedstock and the liquid feedstock respectively have the compositions as shown in following Table 1.

TABLE 1

| Gaseous feedstock (10000 tons/year) | | Liquid feedstocks (10000 tons/year) | |
|---|---|---|---|
| Purchased propane | 100 | Cracking tail oil | 60 |
| liquefied gas | 20 | Heavy naphtha | 140 |
| Recycled propane | 10 | Light naphtha | 30 |
| Recycled ethane | 20 | | |

Example 1

Figure 1B:
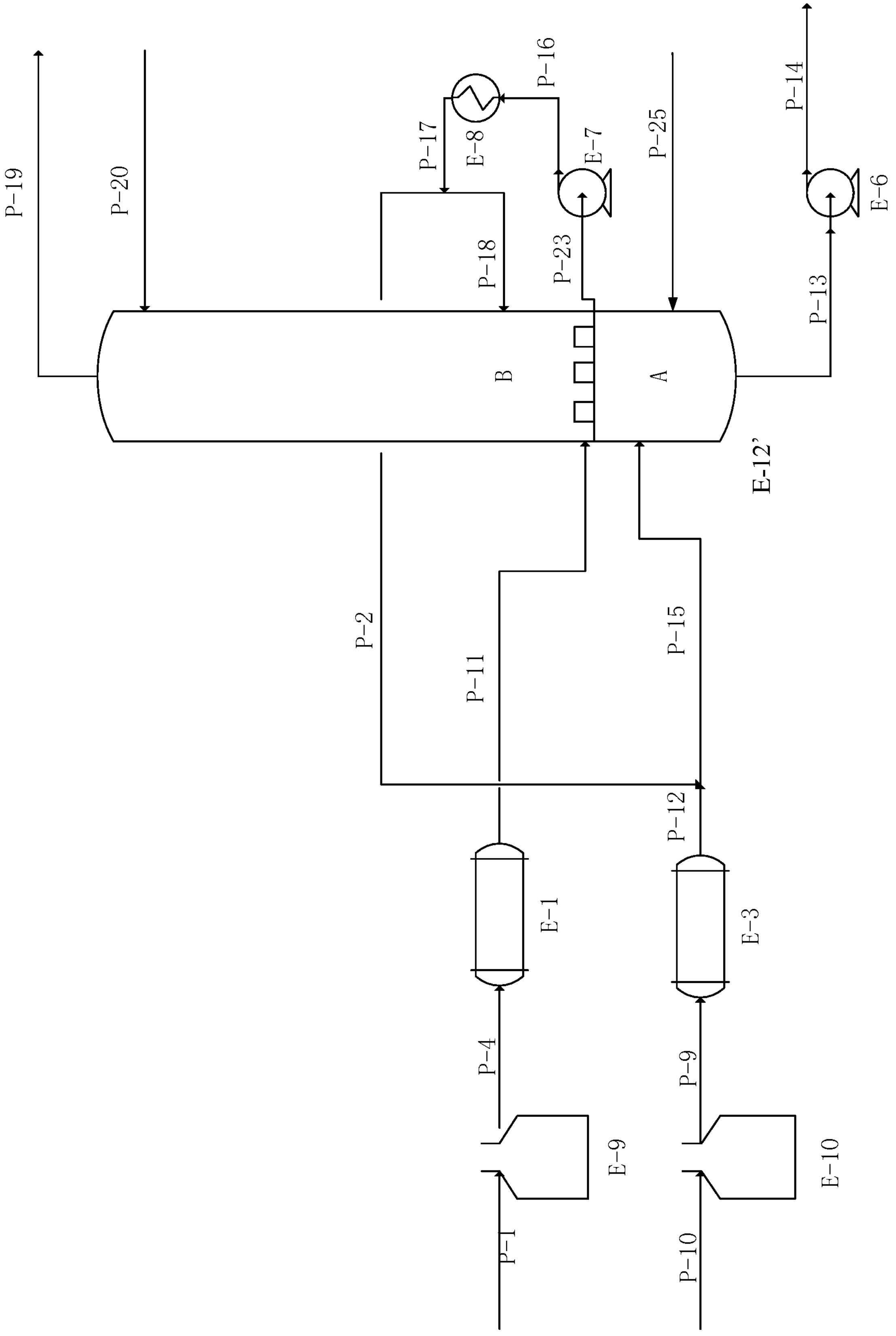

Example 1 is carried out with the device and process flow for recovering heat from cracked gas as shown in FIG. 1*a* and FIG. 1*b*.

The device comprises a heat recovery device for liquid feedstock cracked gas E-3, a heat recovery device for gaseous feedstock cracked gas E-1 and a heavy component removal unit.

The heat recovery device for liquid feedstock cracked gas E-3 is connected to the discharge port of the liquid feedstock cracker E-10, and the feed port of the liquid feedstock cracker E-10 is connected to a pipeline for liquid feedstock.

The heat recovery device for gaseous feedstock cracked gas E-1 is connected to the discharge port of the gaseous feedstock cracker E-9, and the feed port of the gaseous feedstock cracker E-9 is connected to a pipeline for gaseous feedstock.

The heavy component removal unit comprises a fractionating column E-12'. The fractionating column E-12' is divided into two parts by a partition plate, respectively named as the lower A section and the upper B section, wherein the upper B section is divided into, in order of from bottom to top, a quench oil section, a pan oil section and a rectification section, with internals provided therein. The fractionating column E-12' is configured with a discharge pipeline for gas phase at the top of the fractionating column and a discharge pipeline for liquid-solid phase at the bottom of the fractionating column.

The discharge pipeline of the heat recovery device for liquid feedstock cracked gas E-3 is connected to the bottom of the lower A section of the fractionating column E-12', and the discharge pipeline of the heat recovery device for gaseous feedstock cracked gas E-1 is connected to the lower A section (as shown in FIG. 1*a*) or the upper B section (as shown in FIG. 1*b*) of the fractionating column E-12'.

A discharge pipeline for quench oil configured at the bottom of the upper B section of the fractionating column E-12' is connected in succession with the quench oil pump E-7 and the quench oil heat recovery device E-8 and then divided into two branches, with one branch connected to the upper B section of the fractionating column E-12' and the other branch connected to the discharge pipeline of the heat recovery device for liquid feedstock cracked gas E-3.

The lower A section of the fractionating column E-12' is configured with a distributor, and with a feed pipeline for steam configured at the lower part. The upper B section of the fractionating column E-12' is configured with tray internals, and is divided into, in order of from bottom to top, a quench oil section, a pan oil section and a rectification section.

The heat recovery process for cracked gas implemented by using the above device is described as follows:

The liquid feedstock P-10 is cracked in the liquid feedstock cracker E-10 to obtain the liquid feedstock cracked gas P-9. The liquid feedstock cracked gas P-9 is supplied to the heat recovery device for liquid feedstock cracked gas E-3 and is cooled to 410° C., to obtain the liquid feedstock cracked gas after heat recovery P-12, which is mixed with the quench oil P-2 and further cooled to 280° C. and then supplied to the lower A section of the fractionating column E-12'.

In the lower A section of the fractionating column E-12', the gas in the liquid feedstock cracked gas mixed with quench oil P-15 is separated from the liquid and solid particles, and the separated liquid heavy component fuel oil P-13 carrying with solid particles is extracted by the liquid heavy component fuel oil pump E-6 configured at the column bottom, as the discharged liquid heavy component fuel oil P-14; while the separated gas phase passes through the partition plate and enters the upper B section of the fractionating column E-12' for further cooling.

The gaseous feedstock P-1 is cracked in the gaseous feedstock cracker E-9 to obtain the gaseous feedstock cracked gas P-4. The gaseous feedstock cracked gas P-4 is supplied to the heat recovery device for gaseous feedstock cracked gas E-1 for cooling to 210° C. The gaseous feedstock cracked gas after heat recovery P-11 is supplied to the lower A section of the fractionating column E-12' and then connected to the upper B section (as shown in FIG. 1*a*), or is supplied to the upper B section (as shown in FIG. 1*b*).

The gas phase separated from the lower A section of the fractionating column E-12' and the gaseous feedstock cracked gas after heat recovery P-11 are further cooled in the upper B section of the fractionating column E-12', so that some components condense into liquid quench oil. The quench oil P-23 from the bottom of the upper B section is extracted by the quench oil pump E-7 and subjected to heat recovery in the quench oil heat recovery device E-8. A part of the quench oil after heat recovery P-17 is used as the quench oil P-18 to be returned to the upper B section of the fractionating column E-12' and the other part is used as the quench oil P-2 to be mixed with the liquid feedstock cracked gas after heat recovery P-12 and then supplied to the lower A section of the fractionating column E-12'. The uncondensed components are discharged as the overhead gas phase P-19 of the fractionating column E-12'. The fractionating column E-12' is configured at the top with overhead reflux P-20.

The heat recovery device for gaseous feedstock cracked gas E-1 and the heat recovery device for liquid feedstock cracked gas E-3 conduct heat recovery by generating steam, and the generated steam is at a pressure of 11.5 MpaG.

The heat recovery device for gaseous feedstock cracked gas E-1 and the heat recovery device for liquid feedstock cracked gas E-3 are multi-stage heat recovery facilities in series.

Steam P-25 is introduced to the lower part of lower A section of the fractionating column E-12' as stripping medium, and the steam is preferably introduced at a pressure level of 1.6 MpaG.

Example 2

Figure 2:
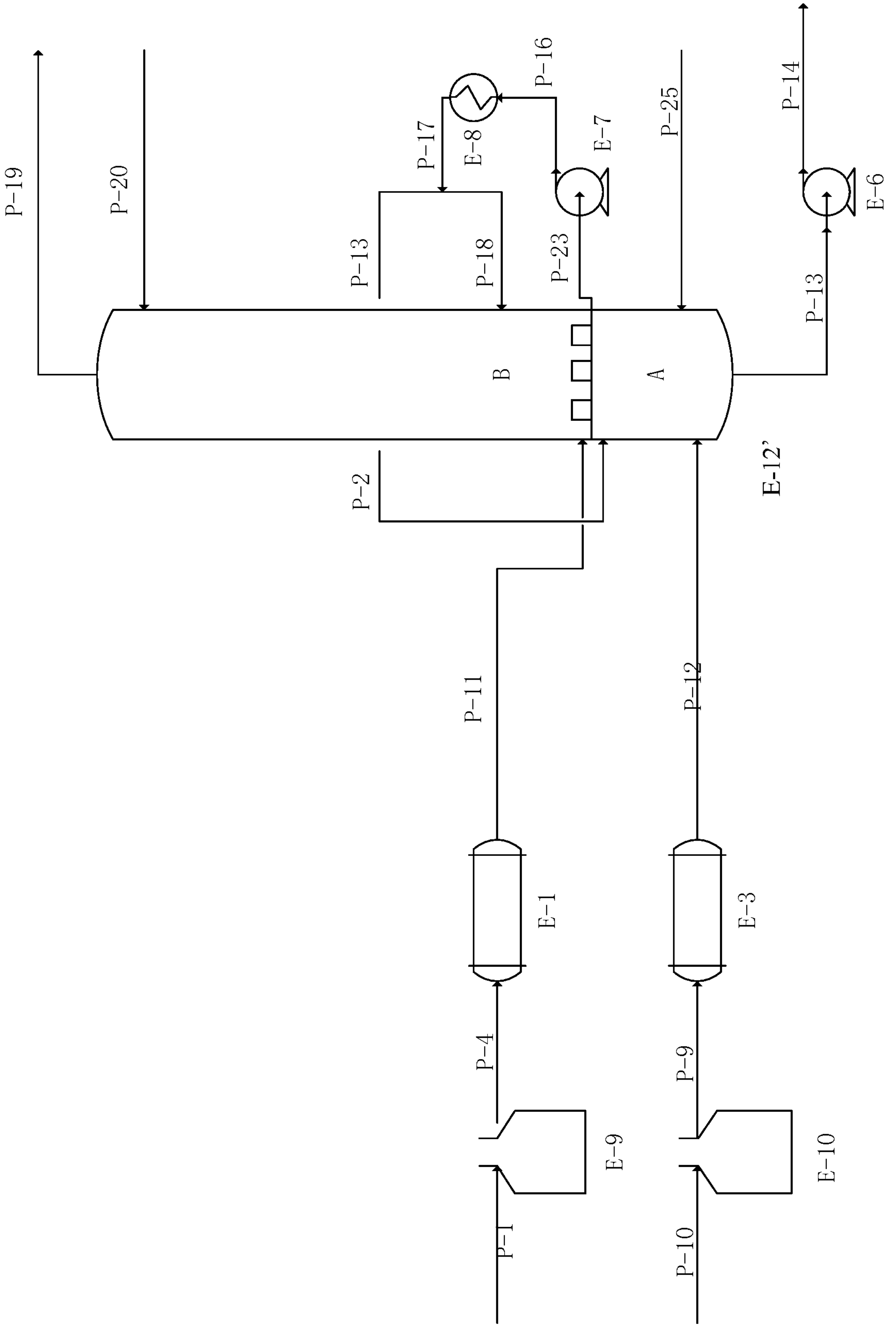
FIG. 2 is a flowchart of the second embodiment of the invention for recovering heat from cracked gas.

Example 2 is carried out with the device and process flow for recovering heat from cracked gas as shown in FIG. 2.

The device comprises a heat recovery device for liquid feedstock cracked gas E-3, a heat recovery device for gaseous feedstock cracked gas E-1 and a heavy component removal unit.

The heat recovery device for liquid feedstock cracked gas E-3 is connected to the discharge port of the liquid feedstock cracker E-10, and the feed port of the liquid feedstock cracker E-10 is connected to a pipeline for liquid feedstock.

The heat recovery device for gaseous feedstock cracked gas E-1 is connected to the discharge port of the gaseous feedstock cracker E-9, and the feed port of the gaseous feedstock cracker E-9 is connected to a pipeline for gaseous feedstock.

The heavy component removal unit comprises a fractionating column E-12'. The fractionating column E-12' is divided into two parts by a partition plate, respectively named as the lower A section and the upper B section. The fractionating column E-12' is configured with an discharge pipeline for gas phase at the top of the fractionating column and a discharge pipeline for liquid-solid phase at the bottom of the fractionating column.

The discharge pipeline of the heat recovery device for liquid feedstock cracked gas E-3 is connected to the bottom of the lower A section of the fractionating column E-12', and the discharge pipeline of the heat recovery device for gaseous feedstock cracked gas E-1 is connected to the upper B section of the fractionating column E-12'.

A discharge pipeline for quench oil configured at the bottom of the upper B section of the fractionating column E-12' is connected in succession with the quench oil pump E-7 and the quench oil heat recovery device E-8, and then divided into two branches, with one branch connected to the upper B section of the fractionating column E-12' and the other branch connected to the top of the lower A section of the fractionating column E-12'.

The lower A section of fractionating column E-12' is configured with a distributor, and with a feed pipeline for steam configured at the lower part. The upper B section of fractionating column E-12' is configured with tray internals, and is divided into, in order of from bottom to top, a quench oil section, a pan oil section and a rectification section.

The heat recovery process for cracked gas implemented by using the above device is described as follows:

The liquid feedstock P-10 is cracked in the liquid feedstock cracker E-10 to obtain the liquid feedstock cracked gas P-9. The liquid feedstock cracked gas P-9 is supplied to the heat recovery device for liquid feedstock cracked gas E-3 and is cooled to 410° C., to obtain the liquid feedstock cracked gas after heat recovery P-12, which is supplied to the bottom of the lower A section of fractionating column E-12'.

In the lower A section of the fractionating column E-12', the liquid feedstock cracked gas after heat recovery P-12 is further cooled to 280° C. by countercurrent contact with the quench oil P-2 from the top of the lower A section of the fractionating column E-12', and then subjected to gas-liquid separation. The separated liquid heavy component fuel oil P-13 carrying with solid particles is extracted by the liquid heavy component fuel oil pump E-6 configured at the column bottom, as the discharged liquid heavy component fuel oil P-14; while the separated gas phase passes through the partition plate and enters the upper B section of fractionating column E-12' for further cooling.

The gaseous feedstock P-1 is cracked in the gaseous feedstock cracker E-9 to obtain the gaseous feedstock cracked gas P-4. The gaseous feedstock cracked gas P-4 is supplied to the heat recovery device for gaseous feedstock cracked gas E-1 for cooling to 210° C. The gaseous feedstock cracked gas after heat recovery P-11 is supplied to the upper B section of the fractionating column E-12'.

The gas phase separated from the lower A section of the fractionating column E-12' and the gaseous feedstock cracked gas after heat recovery P-11 are further cooled in the upper B section of the fractionating column E-12', so that some components condense into liquid quench oil. The quench oil P-23 from the bottom of the upper B section of the fractionating column E-12' is extracted by the quench oil pump E-7 and subjected to heat recovery in the quench oil heat recovery device E-8. A part of the quench oil after heat recovery P-17 is used as the quench oil P-18 to be returned to the upper B section of the fractionating column and the other part is used as the quench oil P-2 to be supplied to the top of the lower A section of the fractionating column E-11. The uncondensed components are discharged as the overhead gas phase P-19 of the fractionating column E-11. The fractionating column E-12' is configured at the top with overhead reflux P-20.

The setting and process conditions of the heat recovery device for gaseous feedstock cracked gas E-1, the heat recovery device for liquid feedstock cracked gas E-3, and the steam P-25 introduced into the lower part of the lower A section of the fractionating column E-12' are same as those described in Example 1.

Comparative Example 1

The Comparative example 1 is implemented with a traditional process, and the same feedstocks as those used in Examples 1 and 2.

A part of the gaseous feedstock cracked gas from the cracker is cooled in a quench boiler to 420° C., mixed with quench oil for further cooling to 275° C., and then supplied to a stripper. Another part is cooled in the quench boiler to 350° C. and then mixed with the liquid feedstock cracked gas.

A gas-liquid separation is conducted in the stripper, and the separated liquid heavy component fuel oil carrying with solid particles is obtained from the column bottom, and the overhead gas phase is supplied to the bottom of the fractionating column for further cooling.

The liquid feedstock cracked gas from the cracker is cooled in the quench boiler to 410° C., mixed with the gaseous feedstock cracked gas at 350° C., and then mixed with the quench oil for further cooling to 200° C. before supplied to the fractionating column.

The fractionating column is configured with overhead reflux.

The cooled mixture of the liquid feedstock cracked gas and the overhead gas phase of the stripper is further cooled in the fractionating column, and some components condense into liquid quench oil.

After being extracted with a pump and subjected to heat recovery, a part of the quench oil is returned to the fractionating column, and the other part is used as quench medium for mixing with the gaseous feedstock cracked gas which has been cooled to 420° C., and then returned to the fractionating column after mixing.

Table 2 lists data including the viscosity of quench oil, heat recovery for cracked gas, energy consumption and operation cost of Examples 1 and 2 using the inventive process and Comparative Example 1 without using the inventive process, all implemented with the same cracking feedstocks.

TABLE 2

| Item | Example 1 | Example 2 | Comparative Example 1 |
|---|---|---|---|
| Bottom temperature of fractionating column (° C.) | 195.3 | 195.1 | 195.0 |
| Viscosity of quench oil (CP) | 0.676 | 0.679 | 7.061 |
| Super high pressure steam (t/hr) | 544.3 | 544.1 | 524.1 |
| Unit energy consumption of ethylene (kg standard oil/t ethylene) | 504.5 | 504.7 | 520.0 |
| Annual operation cost (10000 CNY/10000 tons of ethylene) | baseline-24.8 | baseline-24.4 | baseline |

As can be seen from the data in Table 2, in Comparative Example 1 implemented using the same cracking feedstocks as those in Examples 1 and 2, the amount of generated super high pressure steam and the viscosity of quench oil are respectively 524.1 t/hr and 7.061 CP, the unit energy consumption of ethylene is 520.0 kg standard oil per ton ethylene. On the other hand, in Examples 1 and 2 implemented using the inventive process, the amounts of generated super high pressure steam are respectively 544.3 t/hr and 544.1 t/hr, and the viscosities of quench oil are respectively 0.676 CP and 0.679 CP, the unit energy consumptions of ethylene are respectively 504.5 and 504.7 kg standard oil per ton ethylene, meaning that Examples 1 and 2 realize a reduction in annual operation cost of 248,000 CNY/10,000 tons of ethylene and 245,000 CNY/10,000 tons of ethylene, respectively.

It can be seen from the comparison of the above data that the traditional process involves a lower amount of generated super high pressure steam and a higher viscosity of quench oil. In contrast, the inventive process leads to a higher amount of generated super high pressure steam and a lower viscosity of quench oil and further realize about kg standard oil/ton ethylene reduction in unit energy consumption of ethylene and about 240,000 CNY/10,000 tons of ethylene reduction in annual operation cost, demonstrating that the inventive process contributes to a highly efficient heat recovery for cracked gas and a lower viscosity of quench oil, as well as energy saving, consumption reduction and stable operation of the ethylene plant.

Example 3

Figure 3:
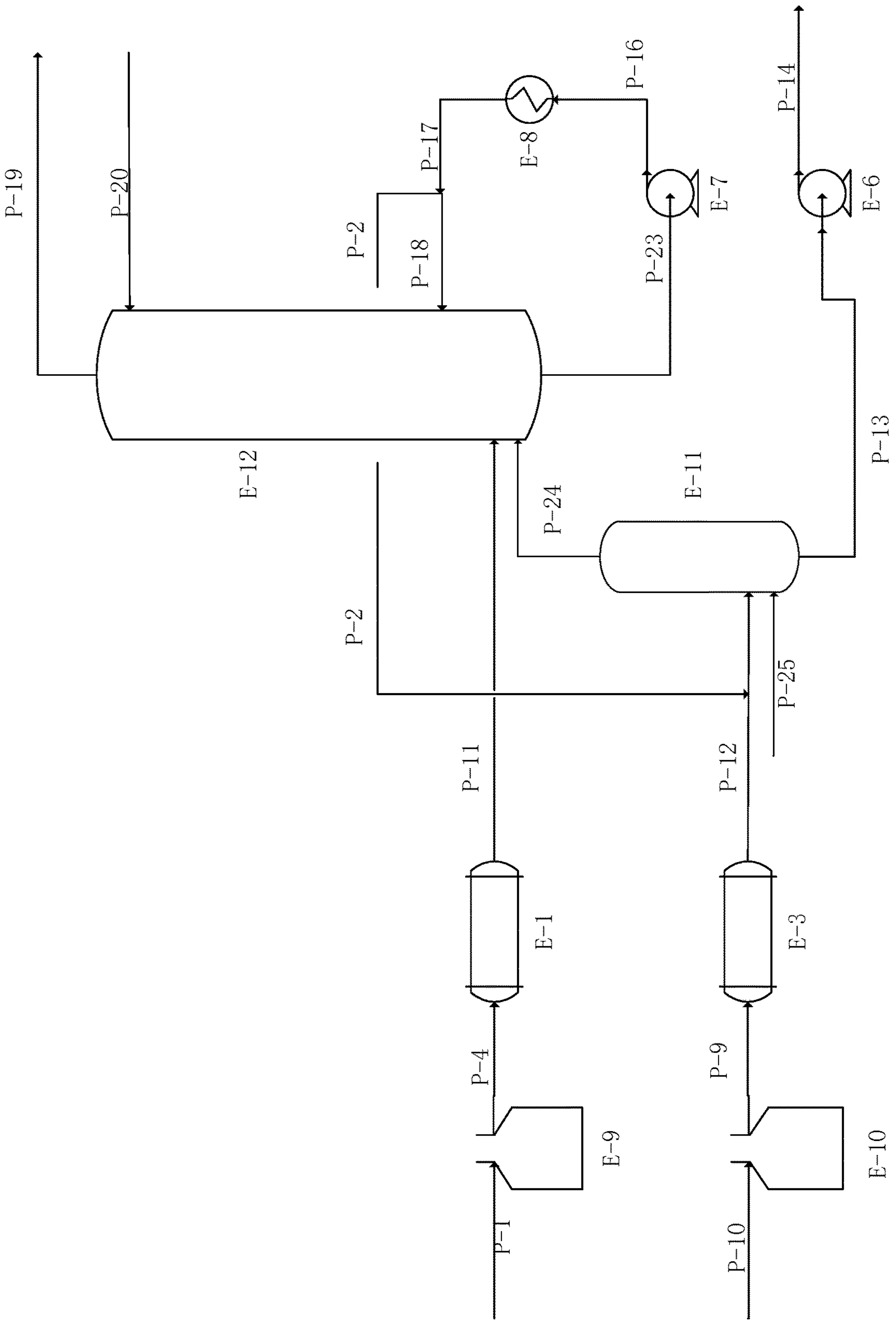
FIG. 3 is a flowchart of the third embodiment of the invention for recovering heat from cracked gas.

Example 3 is carried out with the device and process flow for recovering heat from cracked gas as shown in FIG. 3.

The device comprises a heat recovery device for liquid feedstock cracked gas E-3, a heat recovery device for gaseous feedstock cracked gas E-1 and a heavy component removal unit.

The heat recovery device for liquid feedstock cracked gas E-3 is connected to the discharge port of the liquid feedstock cracker E-10, and the feed port of the liquid feedstock cracker E-10 is connected to a pipeline for liquid feedstock.

The heat recovery device for gaseous feedstock cracked gas E-1 is connected to the discharge port of the gaseous feedstock cracker E-9, and the feed port of the gaseous feedstock cracker E-9 is connected to a pipeline for gaseous feedstock.

The heavy component removal unit comprises a heavy component removal column E-11 and a gasoline fractionating column E-12, wherein the heavy component removal column E-11 is configured with a discharge pipeline at the top of the heavy component removal column and a discharge pipeline for liquid-solid heavy component fuel oil at the bottom of the heavy component removal column, and is connected to the gasoline fractionating column E-12 via the discharge pipeline at the top of the heavy component removal column.

The discharge pipeline of the heat recovery device for liquid feedstock cracked gas E-3 is connected to the heavy component removal column E-11, and the discharge pipeline of the heat recovery device for gaseous feedstock cracked gas E-1 is connected to gasoline fractionating column E-12.

The gasoline fractionating column E-12 is configured with a discharge pipeline for gas phase at the top and a discharge pipeline for quench oil at the bottom. The discharge pipeline for quench oil is connected in succession with the quench oil pump E-7 and the quench oil heat recovery device E-8, and then divided into two branches, with one branch connected to the gasoline fractionating column E-12 and the other branch connected to the discharge pipeline of the heat recovery device for liquid feedstock cracked gas E-3.

The heavy component removal column E-11 is configured with a distributor, and with a feed pipeline for steam configured at the lower part.

The gasoline fractionating column E-12 is configured with tray internals and is divided into, in order of from bottom to top, a quench oil section, a pan oil section and a rectification section.

The heat recovery process for cracked gas implemented by using the above device is described as follows:

The liquid feedstock P-10 is cracked in the liquid feedstock cracker E-10 to obtain the liquid feedstock cracked gas P-9. The liquid feedstock cracked gas P-9 is cooled in the heat recovery device for liquid feedstock cracked gas E-3 to 450° C., to obtain the liquid feedstock cracked gas after heat recovery P-12, which is mixed with the quench oil P-2 for further cooling to 282° C. and then supplied to the heavy component removal column E-11.

In the heavy component removal column E-11, the gas in the liquid feedstock cracked gas mixed with quench oil is separated from the liquid and solid particles. The overhead gas phase P-24 of the heavy component removal column E-11 enters the gasoline fractionating column E-12 for further cooling, and the liquid heavy component fuel oil P-13 carrying with solid particles is extracted from the bottom of the heavy component removal column E-11 to remove the heavy components from the liquid feedstock cracked gas. The liquid heavy component fuel oil P-13 is discharged by the liquid heavy component fuel oil pump E-6 configured at the column bottom, as the discharged liquid heavy component fuel oil P-14.

The gaseous feedstock P-1 is cracked in the gaseous feedstock cracker E-9 to obtain the gaseous feedstock cracked gas P-4. The gaseous feedstock cracked gas P-4 is supplied to the heat recovery device for gaseous feedstock cracked gas E-1 for cooling to 213° C., and the gaseous feedstock cracked gas after heat recovery P-11 is supplied to the gasoline fractionating column E-12.

The overhead gas phase P-24 of the heavy component removal column E-11 and the gaseous feedstock cracked gas after heat recovery P-11 are further cooled in the gasoline fractionating column E-12, so that some components condense into liquid quench oil. The quench oil P-23 from the bottom of the gasoline fractionating column is extracted by the quench oil pump E-7 and subjected to heat recovery in the quench oil heat recovery device E-8. A part of the quench oil after heat recovery P-17 is used as the quench oil P-18 to be returned to the gasoline fractionating column E-12, and the other part is used as the quench oil P-2 to be mixed with the liquid feedstock cracked gas after heat recovery P-12 and then supplied to the heavy component removal column E-11. The uncondensed components are discharged as the overhead gas phase P-19 of the gasoline fractionating column E-12. The fractionating column E-12 is configured at the top with overhead reflux P-20.

The heat recovery device for gaseous feedstock cracked gas E-1 and the heat recovery device for liquid feedstock cracked gas E-3 conduct heat recovery by generating steam, and the generated steam is at a pressure of 11.5 MpaG.

The heat recovery device for gaseous feedstock cracked gas E-1 and the heat recovery device for liquid feedstock cracked gas E-3 are multi-stage heat recovery devices in series.

Steam P-25 is introduced into the lower part of the heavy component removal column E-11 as stripping medium, and the steam is preferably introduced at a pressure level of 1.6 MpaG.

Example 4

Figure 4:
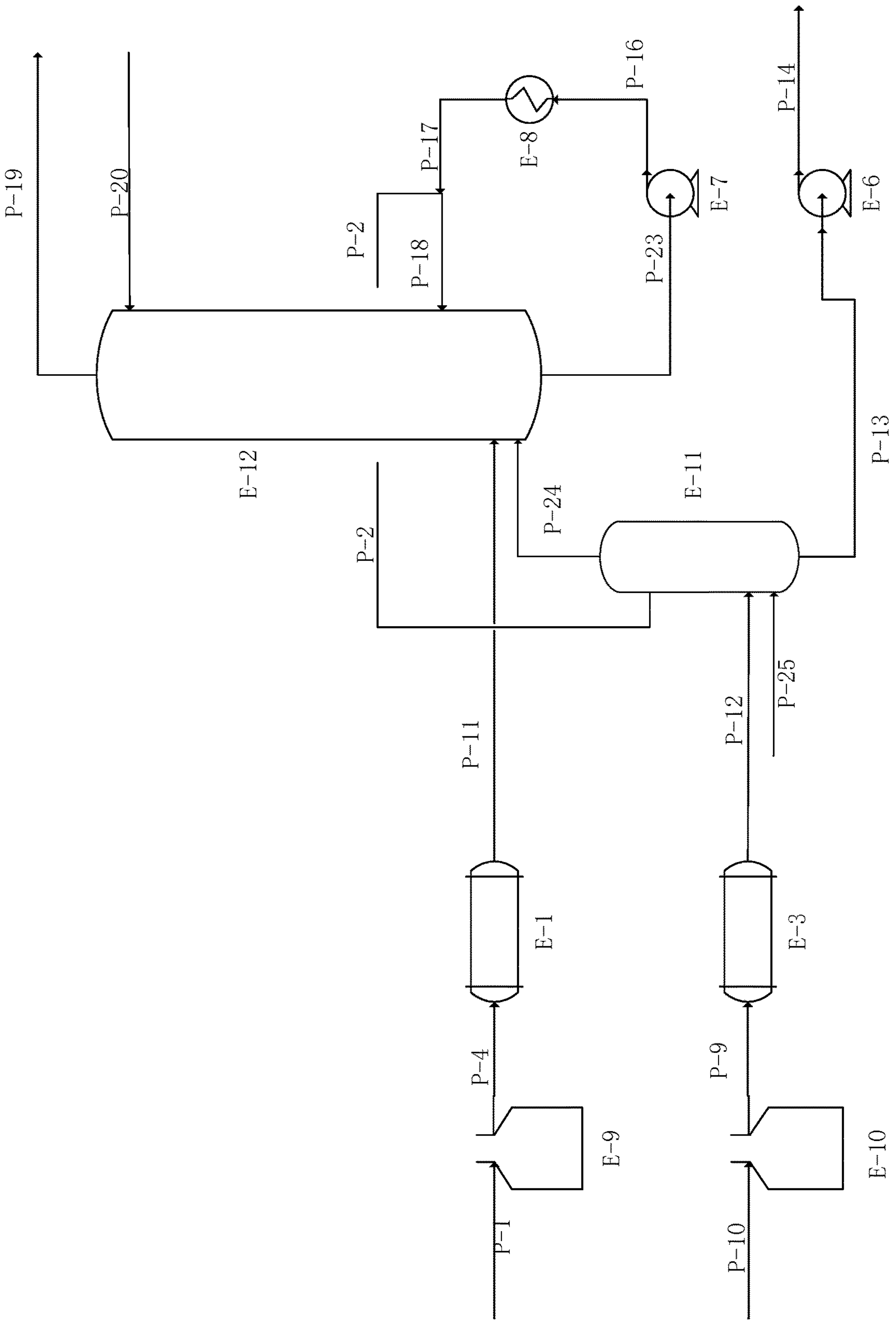
FIG. 4 is a flowchart of the fourth embodiment of the invention for recovering heat from cracked gas.

Example 4 is carried out with the device and process flow for recovering heat from cracked gas as shown in FIG. 4.

The device comprises a heat recovery device for liquid feedstock cracked gas E-3, a heat recovery device for gaseous feedstock cracked gas E-1 and a heavy component removal unit.

The heat recovery device for liquid feedstock cracked gas E-3 is connected to the discharge port of the liquid feedstock cracker E-10, and the feed port of the liquid feedstock cracker E-10 is connected to a pipeline for liquid feedstock.

The heat recovery device for gaseous feedstock cracked gas E-1 is connected to the discharge port of the gaseous feedstock cracker E-9, and the feed port of the gaseous feedstock cracker E-9 is connected to a pipeline for gaseous feedstock.

The heavy component removal unit comprises a heavy component removal column E-11 and a gasoline fractionating column E-12, wherein the heavy component removal column E-11 is configured with a discharge pipeline at the top of the heavy component removal column and a discharge pipeline for liquid-solid heavy component fuel oil at the bottom of the heavy component removal column, and is connected to the gasoline fractionating column E-12 via the discharge pipeline at the top of the heavy component removal column.

The discharge pipeline of the heat recovery device for liquid feedstock cracked gas E-3 is connected to the lower part of the heavy component removal column E-11, and the discharge pipeline of the heat recovery device for gaseous feedstock cracked gas E-1 is connected with gasoline fractionating column E-12.

The gasoline fractionating column E-12 is configured with a discharge pipeline for gas phase at the top and a discharge pipeline for quench oil at the bottom. The discharge pipeline for quench oil is connected in succession with the quench oil pump E-7 and the quench oil heat recovery device E-8, and then divided into two branches, with one branch connected to the gasoline fractionating column E-12 and the other branch connected to the upper part of the heavy component removal column E-11.

The heavy component removal column E-11 is configured with a distributor, and with a feed pipeline for steam configured at the lower part.

The gasoline fractionating column E-12 is configured with tray internals and is divided into, in order of from bottom to top, a quench oil section, a pan oil section and a rectification section.

The heat recovery process for cracked gas implemented by using the above device is described as follows:

The liquid feedstock P-10 is cracked in the liquid feedstock cracker E-10 to obtain the liquid feedstock cracked gas P-9. The liquid feedstock cracked gas P-9 is cooled in the heat recovery device for liquid feedstock cracked gas E-3 to 450° C., to obtain the liquid feedstock cracked gas after heat recovery P-12, then is supplied to the bottom of the heavy component removal column E-11.

In the heavy component removal column E-11, the liquid feedstock cracked gas after heat recovery P-12 is further cooled to 282° C. by countercurrent contact with the quench oil P-2 supplied to the top of the heavy component removal column E-11, and then subjected to gas-liquid separation. The overhead gas phase P-24 of the heavy component removal column E-11 enters the gasoline fractionating column E-12 for further cooling, and the liquid heavy component fuel oil P-13 carrying with solid particles is extracted from the bottom of the heavy component removal column E-11 to remove the heavy components from the liquid feedstock cracked gas. The liquid heavy component fuel oil P-13 is discharged by the liquid heavy component fuel oil pump E-6 configured at the column bottom, as the discharged liquid heavy component fuel oil P-14.

The gaseous feedstock P-1 is cracked in the gaseous feedstock cracker E-9 to obtain the gaseous feedstock cracked gas P-4. The gaseous feedstock cracked gas P-4 is supplied to the heat recovery device for gaseous feedstock cracked gas E-1 for cooling to 213° C., and the gaseous feedstock cracked gas after heat recovery P-11 is supplied to the gasoline fractionating column E-12.

The overhead gas phase P-24 of the heavy component removal column E-11 and the gaseous feedstock cracked gas after heat recovery P-11 are further cooled in the gasoline fractionating column E-12, so that some components condense into liquid quench oil. The quench oil P-23 from the bottom of the gasoline fractionating column E-12 is extracted by the quench oil pump E-7 and subjected to heat recovery in the quench oil heat recovery device E-8. A part of the quench oil after heat recovery P-17 is used as the quench oil P-18 to be returned to the gasoline fractionating column E-12, and the other part is used as the quench oil P-2 to be supplied to the top of the heavy component removal column E-11. The uncondensed components are discharged as the overhead gas phase P-19 of the gasoline fractionating column E-12. The gasoline fractionating column E-12 is configured at the top with overhead reflux P-20.

The setting and process conditions of the heat recovery device for gaseous feedstock cracked gas E-1, the heat recovery device for liquid feedstock cracked gas E-3, and the steam P-25 introduced into the lower part of the heavy component removal column E-11 are same as those described in Example 3.

Comparative Example 2

The Comparative Example 2 is implemented with a traditional process, and the same feedstocks as those used in Examples 3 and 4.

A part of the gaseous feedstock cracked gas from the cracker is cooled in a quench boiler to 420° C., mixed with quench oil for further cooling to 275° C., and then supplied to a stripper. Another part is cooled in the quench boiler to 350° C. and then mixed with the liquid feedstock cracked gas.

A gas-liquid separation is conducted in the stripper, and the separated liquid heavy component fuel oil carrying with solid particles is obtained from the column bottom, and the overhead gas phase is supplied to the bottom of the fractionating column for further cooling.

The liquid feedstock cracked gas from the cracker is cooled in the quench boiler to 410° C., mixed with the gaseous feedstock cracked gas at 350° C., and then mixed with the quench oil for further cooling to 200° C. before supplied to the fractionating column.

The fractionating column is configured with overhead reflux.

The cooled mixture of the liquid feedstock cracked gas and the overhead gas phase of the stripper is further cooled in the fractionating column, and some components condense into liquid quench oil.

After being extracted by a pump and subjected to heat recovery, a part of the quench oil is returned to the fractionating column, and the other part is used as quench medium for mixing with the gaseous feedstock cracked gas which has been cooled to 420° C., and then returned to the fractionating column.

Table 3 lists data including the bottom temperature of the gasoline fractionating column, the composition and viscosity of quench oil of Examples 3 and 4 using the inventive process and Comparative Example 2 without using the inventive process, all implemented with the same cracking feedstocks.

TABLE 3

| Item | Example 3 | Example 4 | Comparative Example 2 |
|---|---|---|---|
| Bottom temperature of gasoline fractionating column (° C.) | 199.6 | 199.7 | 195.0 |
| Composition of quench oil (mol %) | | | |
| PGO | 94.87 | 94.79 | 60.24 |
| PFO | 0.2614 | 0.2630 | 36.66 |
| Viscosity of quench oil (CP) | 0.661 | 0.663 | 7.061 |
| Circulation of quench oil (t/hr) | 5752.9 | 5752.2 | 8399.1 |

As can be seen from the data in Table 3, in Comparative Example 2 implemented using the same cracking feedstocks as those in Examples 3 and 4, when the gasoline fractionating column has a bottom temperature of 195° C., the quench oil contains 60.24 mol % PGO components and 36.66 mol % PFO components, having a viscosity of quench oil of 7.061 CP and a circulation of quench oil of 8399.1 t/hr. On the other hand, in Examples 3 and 4 implemented using the inventive process, when the gasoline fractionating column has a bottom temperature of about 200° C., the quench oil contains nearly 95 mol % PGO components, and less than 0.3 mol % PFO components, with a viscosity of quench oil of respectively 0.661 CP and 0.663 CP, and a circulation of respectively 5752.9 t/hr and 5752.2 t/hr.

It can be seen from the comparison of the above data that, when the inventive process is not adopted, the quench oil has a higher viscosity even at lower bottom temperature of the gasoline fractionating column, while the presently claimed process can achieve a higher bottom temperature of gasoline fractionating column, and meanwhile reduced viscosity of quench oil and circulation of quench oil, which is of great significance to the stable operation of quench oil dilution steam generation system and to the reduction of capital investment and operation cost of ethylene plant.

Example 5

Figure 5:
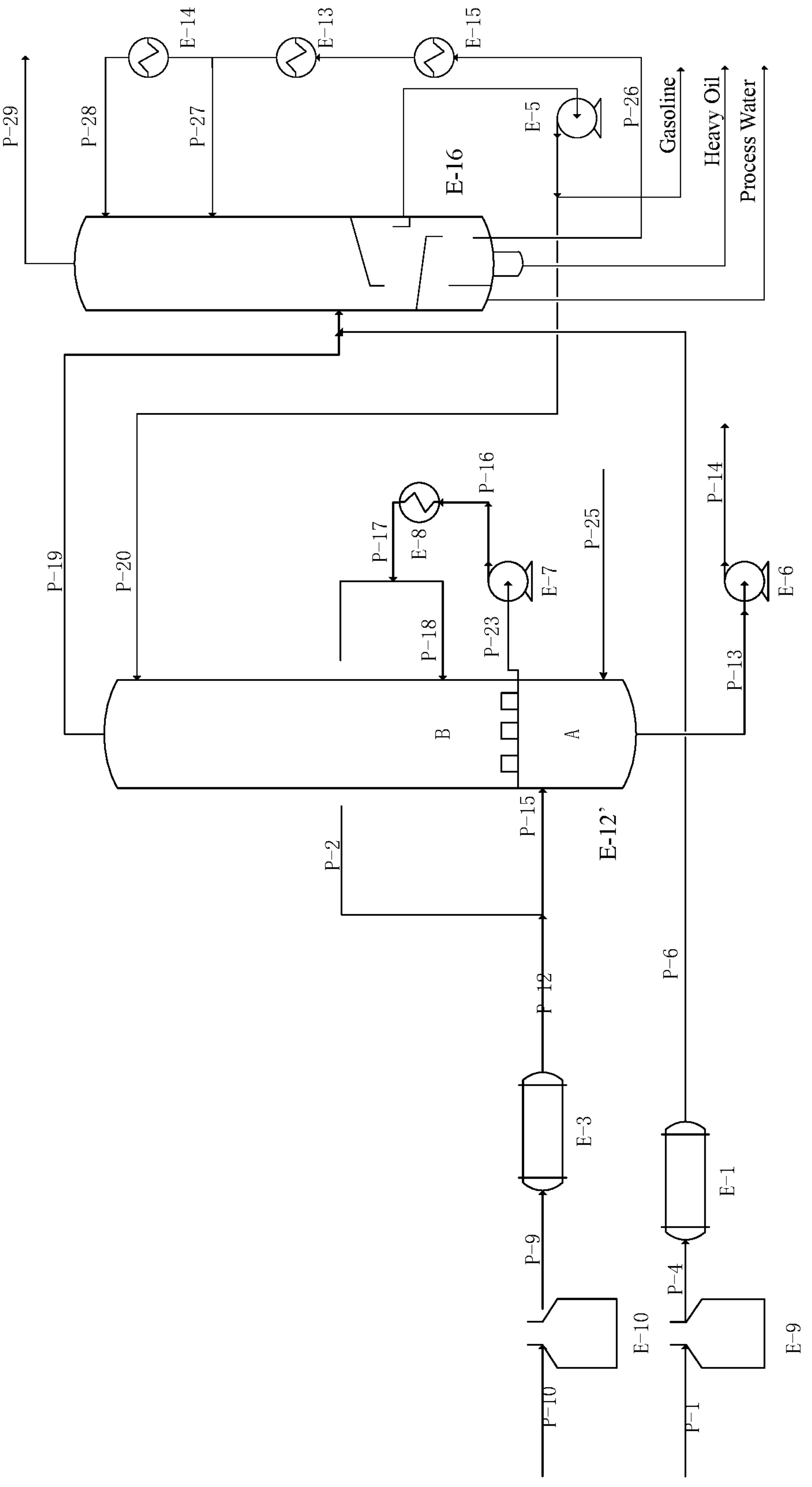
FIG. 5 is a flowchart of the fifth embodiment of the present invention for recovering heat from cracked gas.

Example 5 is carried out with the device and process flow for recovering heat from cracked gas as shown in FIG. 5.

The waste heat recovery apparatus for cracked gas comprises a heat recovery device for liquid feedstock cracked gas E-3, a heat recovery device for gaseous feedstock cracked gas E-1, a fractionating column E-12' and a quench water column E-16.

The heat recovery device for liquid feedstock cracked gas E-3 is connected to the discharge port of the liquid feedstock cracker E-10, and the feed port of the liquid feedstock cracker E-10 is connected to a pipeline for liquid feedstock.

The heat recovery device for gaseous feedstock cracked gas E-1 is connected to the discharge port of the gaseous feedstock cracker E-9, and the feed port of the gaseous feedstock cracker E-9 is connected to a pipeline for gaseous feedstock.

The fractionating column E-12' is divided into two parts by a partition plate, respectively named as the lower A section and the upper B section. The fractionating column E-12' is configured with a discharge pipeline for gas phase at the top of the fractionating column and a discharge pipeline for liquid-solid phase at the bottom of the fractionating column, and is connected to a quench water column E-16 via the discharge pipeline for gas phase at the top of the fractionating column. A discharge pipeline for quench oil is configured at the bottom of the upper B section of the fractionating column E-12' and connected in succession with the quench oil pump E-7 and the quench oil heat recovery device E-8, and then divided into two branches, with one branch connected to the upper B section of the fractionating column E-12' and the other branch connected to the discharge pipeline of the heat recovery device for liquid feedstock cracked gas E-3.

The discharge pipeline of the heat recovery device for liquid feedstock cracked gas E-3 is connected to the lower A section of the fractionating column E-12'.

The discharge pipeline of heat recovery device for gaseous feedstock cracked gas E-1 is connected to the quench water column E-16.

The quench water column E-16 is configured with a discharge pipeline at the top of quench water column, an extraction pipeline for heavy oil at the bottom of quench water column, an extraction pipeline for gasoline at the bottom of quench water column, a discharge pipeline for process water and a discharge pipeline for quench water.

The extraction pipeline for gasoline is configured at a higher position at the bottom of the quench water column E-16, and is connected to the reflux gasoline pump E-5 and then divided into two branches, with one branch connected to the top of the fractionating column E-12' and the other branch connected to a downstream stripping device.

The discharge pipeline for quench water is connected to the quench water heat recovery device E-15 and the first quench water cooler E-13, and then divided into two branches, with one branch connected to the middle part of the quench water column E-16, and the other branch connected to the second quench water cooler E-14 and then to the top of the quench water column E-16.

The lower A section of the fractionating column E-12' is configured with a distributor, and the lower part of the lower A section is configured with a feed pipeline for steam. The upper B section of the fractionating column E-12' is configured with tray internals and is divided into, in order of from bottom to top, a quench oil section, a pan oil section and a rectification section.

The heat recovery process for cracked gas implemented by using the above device is described as follows:

The liquid feedstock P-10 is cracked in the liquid feedstock cracker E-10 to obtain the liquid feedstock cracked gas P-9. The liquid feedstock cracked gas P-9 is supplied to the heat recovery device for liquid feedstock cracked gas E-3 and is cooled to 410° C. to obtain the liquid feedstock cracked gas after heat recovery P-12, which is mixing with the quench oil P-2 and further cooled to 280° C. and then supplied to the lower A section of the fractionating column E-12'.

In the lower A section of the fractionating column E-12', the gas in the liquid feedstock cracked gas mixed with quench oil is separated from the liquid and solid particles. The separated liquid heavy component fuel oil P-13 carrying with solid particles is discharged by the liquid heavy component fuel pump E-6 configured at the column bottom, as the discharged liquid heavy component fuel oil P-14; while the separated gas phase passes through the partition plate and enters the upper B section of the fractionating column E-12' for further cooling. Some components condense into liquid quench oil. The quench oil P-23 from the bottom of the upper B section of fractionating column E-12' is extracted by the quench oil pump E-7 and subjected to heat recovery in the quench oil heat recovery device E-8. A part of the quench oil after heat recovery P-17 is returned to the upper B section of the fractionating column E-12', and the other part is used as the quench oil P-2 to be mixed with liquid feedstock cracked gas after heat recovery P-12 and then supplied to the lower A section of the fractionating column E-12'. The overhead cracked gas of fractionating column P-19 is supplied to the quench water column E-16 for further cooling.

The gaseous feedstock P-1 is cracked in the gaseous feedstock cracker E-9 to obtain the gaseous feedstock cracked gas P-4. The gaseous feedstock cracked gas P-4 is supplied to the heat recovery device for gaseous feedstock cracked gas E-1 for cooling to 143° C., and the gaseous feedstock cracked gas after heat recovery P-6 is supplied to the quench water column E-16.

The overhead gas phase of gasoline fractionating column P-19 and the gaseous feedstock cracked gas after heat recovery P-6 are further cooled by mixing with quench water in the quench water column E-16. The overhead cracked gas of quench water column P-29 is discharged from the discharge pipeline at the top of the quench water column, and the heavy components are condensed into gasoline that is lighter than water and heavy oil that is heavier than water. The gasoline is extracted at a higher position at the bottom of the quench water column E-16, boosted by the reflux gasoline pump E-5 and then divided into two streams, with one stream supplied to the top of the fractionating column E-12' as the reflux gasoline P-20 and the other stream supplied to a downstream stripping device. The heavy oil is extracted after oil-water separation in the sump at the bottom of the quench water column E-16, and the process water is separated from the bottom of the quench water column E-16 and supplied to a downstream dilution steam generation system. The quench water P-26 is separated from the bottom of the quench water column E-16, with the quench water after primary quench water cooler P-27 returned to the middle of the quench water column E-16 and quench water after secondary quench water cooler P-28 returned to the top of the quench water column E-16.

The heat recovery device for gaseous feedstock cracked gas E-1 and the heat recovery device for liquid feedstock cracked gas E-3 are subjected to heat recovery by generating steam, and the generated steam is at a pressure of 11.5 MpaG.

The heat recovery device for gaseous feedstock cracked gas E-1 and the heat recovery device for liquid feedstock cracked gas E-3 are multi-stage heat recovery devices in series.

Steam P-25 is introduced into the lower part of the lower A section of the fractionating column E-12' as stripping medium, and the steam is introduced at a pressure level of 1.6 MpaG.

Example 6

Figure 6:
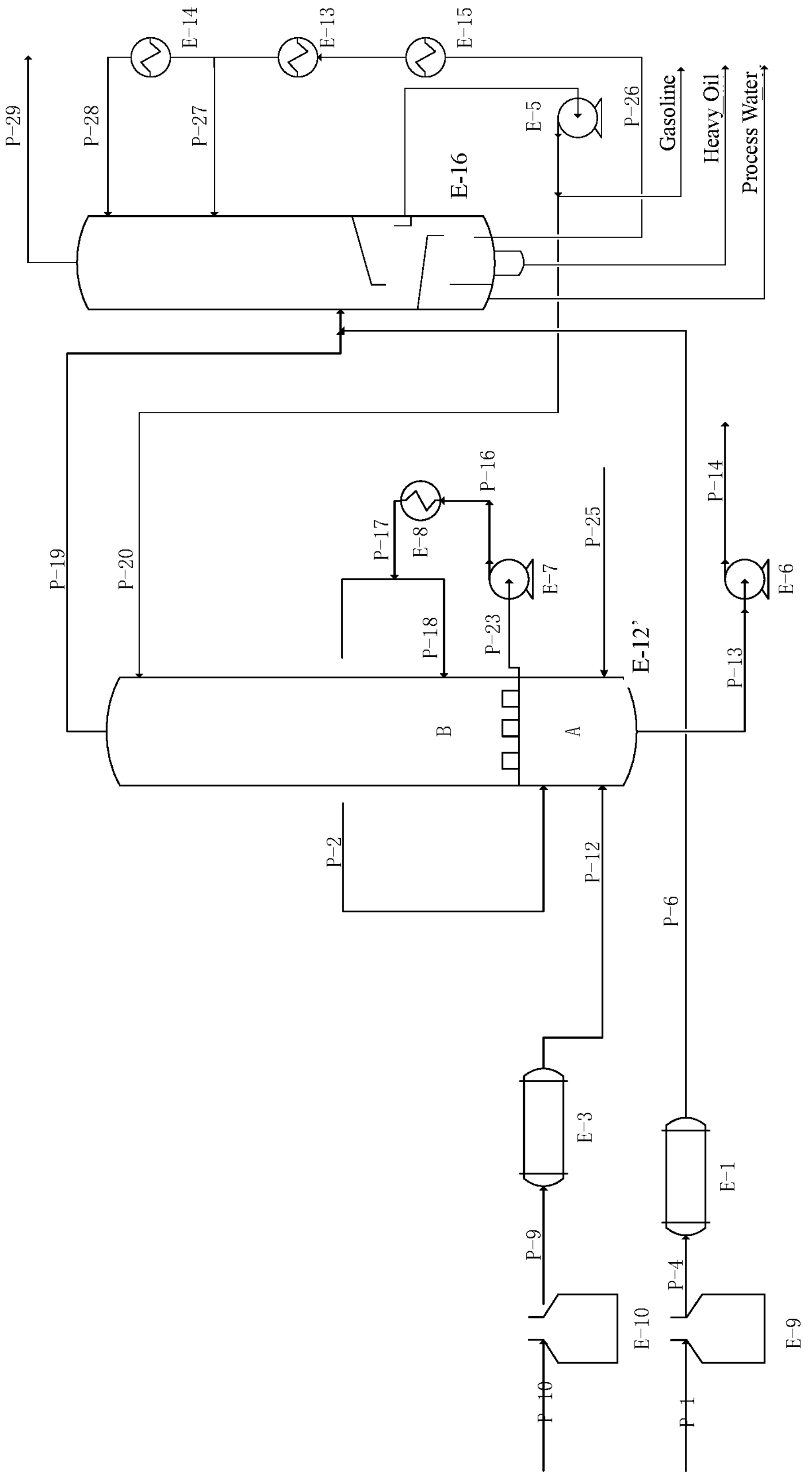
FIG. 6 is a flowchart of the sixth embodiment of the invention for recovering heat from cracked gas.

Example 6 is carried out with the device and process flow for recovering heat from cracked gas as shown in FIG. 6.

The cracked gas waste heat recovery device comprises a heat recovery device for liquid feedstock cracked gas E-3, a heat recovery device for gaseous feedstock cracked gas E-1, a fractionating column E-12' and a quench water column E-16.

The heat recovery device for liquid feedstock cracked gas E-3 is connected to the discharge port of the liquid feedstock cracker E-10, and the feed port of the liquid feedstock cracker E-10 is connected with a pipeline for liquid feedstock.

The heat recovery device for gaseous feedstock cracked gas E-1 is connected to the discharge port of the gaseous feedstock cracker E-9, and the feed port of the gaseous feedstock cracker E-9 is connected with a pipeline for gaseous feedstock.

The fractionating column E-12' is divided into two parts by a partition plate, respectively named as the lower A section and the upper B section. The fractionating column E-12' is configured with a discharge pipeline for gas phase at the top of the fractionating column and a discharge pipeline for liquid-solid phase at the bottom of the fractionating column, and is connected to a quench water column E-16 via the discharge pipeline for gas phase at the top of the fractionating column. A discharge pipeline for quench oil is configured at the bottom of the upper B section of the fractionating column E-12' and connected in succession with the quench oil pump E-7 and the quench oil heat recovery device E-8, and then divided into two branches, with one branch connected to the upper B section of the fractionating column E-12' and the other branch connected to the lower A section of the fractionating column E-12'.

The discharge pipeline of the heat recovery device for liquid feedstock cracked gas E-3 is connected to the lower A section of the fractionating column E-12'.

The discharge pipeline of gaseous feedstock cracked gas heat recovery device E-1 is connected to the quench water column E-16.

The quench water column E-16 is configured with a discharge pipeline at the top of quench water column, an extraction pipeline for heavy oil at the bottom of quench water column, an extraction pipeline for gasoline at the bottom of quench water column, a discharge pipeline for process water and a discharge pipeline for quench water.

The extraction pipeline for gasoline is configured at a higher position at the bottom of the quench water column E-16, and is connected to the reflux gasoline pump E-5 and then divided into two branches, with one branch connected to the top of the fractionating column E-12' and the other branch connected to a downstream stripping device.

The discharge pipeline for quench water is connected to the quench water heat recovery device E-15 and the first quench water cooler E-13, and then divided into two branches, with one branch connected to the middle part of the quench water column E-16, and the other branch connected to the second quench water cooler E-14 and then to the top of the quench water column E-16.

The lower A section of the fractionating column E-12' is configured to a distributor, and the lower part of the lower A section is configured with a feed pipeline for steam. The upper B section of the fractionating column E-12' is configured with tray internals and is divided into, in order of from bottom to top, a quench oil section, a pan oil section and a rectification section.

The heat recovery process for cracked gas implemented by using the above device is described as follows:

The liquid feedstock P-10 is cracked in the liquid feedstock cracker E-10 to obtain the liquid feedstock cracked gas P-9. The liquid feedstock cracked gas P-9 is supplied to the heat recovery device for liquid feedstock cracked gas E-3 and is cooled to 410° C. to obtain the liquid feedstock cracked gas after heat recovery P-12, which is further supplied to the lower A section of fractionating column E-12'.

In the lower A section of the fractionating column E-12', the liquid feedstock cracked gas after heat recovery P-12 is further cooled to 280° C. by countercurrent contact with the quench oil P-2 supplied from the top of the lower A section of the fractionating column E-12', and then subjected to gas-liquid separation. The separated liquid heavy component fuel oil P-13 carrying with solid particles is discharged by the liquid heavy component fuel oil pump E-6 configured at the column bottom, as the discharged liquid heavy component fuel oil P-14; while the separated gas phase passes through the partition plate and enters the upper B section of the fractionating column E-12' for further cooling. Some components condense into liquid quench oil. The quench oil P-23 from the bottom of the upper B section of fractionating column E-12' is extracted by the quench oil pump E-7 and subjected to heat recovery in the quench oil heat recovery device E-8. A part of the quench oil after heat recovery P-17 is returned to the upper B section of the fractionating column E-12', and the other part is used as the quench oil P-2 to be supplied to the lower A section of the fractionating column E-12'. The overhead cracked gas of fractionating column P-19 is supplied to the quench water column E-16 for further cooling.

The gaseous feedstock P-1 is cracked in the gaseous feedstock cracker E-9 to obtain the gaseous feedstock cracked gas P-4. The gaseous feedstock cracked gas P-4 is supplied to the heat recovery device for gaseous feedstock cracked gas E-1 for cooling to 143° C., and the gaseous feedstock cracked gas after heat recovery P-6 is supplied to the quench water column E-16.

The overhead cracked gas of gasoline fractionating column P-19 and the gaseous feedstock cracked gas after heat recovery P-6 are further cooled by mixing with quench water in the quench water column E-16. The overhead cracked gas of quench water column P-29 is discharged from the discharge pipeline at the top of the quench water column, and the heavy components are condensed into gasoline that is lighter than water and heavy oil that is heavier than water. The gasoline is extracted at a higher position at the bottom of the quench water column E-16, boosted by the reflux gasoline pump E-5 and then divided into two streams, with one stream supplied to the top of the fractionating column E-12' as reflux gasoline P-20 and the other stream supplied to a downstream stripping device. The heavy oil is extracted after oil-water separation in the sump at the bottom of the quench water column E-16, and the process water is separated from the bottom of the quench water column E-16 and supplied to a downstream dilution steam generation system. The quench water P-26 is separated from the bottom of the quench water column E-16, with the quench water after primary quench water cooler P-27 returned to the middle of the quench water column E-16 and quench water after secondary quench water cooler P-28 returned to the top of the quench water column E-16.

The setting and process conditions of the heat recovery device for gaseous feedstock cracked gas E-1, the heat recovery device for liquid feedstock cracked gas E-3, and the steam P-25 introduced into the lower part of the lower A section of the fractionating column E-12' are same as those described in Example 5.

Comparative Example 3

The Comparative example 3 is implemented with a traditional process, and the same feedstocks as those used in Examples 5 and 6.

The gaseous feedstock cracked gas from the cracker is cooled in a quench boiler to 420° C., mixed with quench oil for further cooling to 275° C., and then supplied to a stripper.

A gas-liquid separation is conducted in the stripper, and the separated liquid heavy component fuel oil carrying with solid particles is obtained from the column bottom, and the overhead gas phase is supplied to the bottom of the fractionating column for further cooling.

The liquid feedstock cracked gas from the cracker is cooled in a heat recovery device to a temperature of 410° C., and then mixed with quench oil for further cooling to 200° C. before supplied to the fractionating column.

The fractionating column is configured with overhead reflux.

The cooled mixture of the liquid feedstock cracked gas and the overhead gas phase of the stripper is further cooled in the fractionating column, wherein some components condense into liquid quench oil, and the gas components are supplied to the quench water column for further cooling.

After being extracted by a pump and subjected to heat recovery, a part of the quench oil is returned to the fractionating column, and the other part is used as quench medium for mixing with the gaseous feedstock cracked gas which has been cooled to 410° C., and then returned to the fractionating column.

Table 4 lists data including heat recovery of cracked gas and viscosity of quench oil of Examples 5 and 6 using the inventive process and Comparative Example 3 without using the inventive process, all implemented with the same cracking feedstocks.

TABLE 4

| Item | Example 5 | Example 6 | Comparative Example 3 |
|---|---|---|---|
| Bottom temperature of fractionating column (° C.) | 195.1 | 195.2 | 195.3 |
| Viscosity of quench oil/(CP) | 0.673 | 0.675 | 7.066 |
| Super high pressure steam volume (t/hr) | 544.1 | 543.9 | 524.0 |
| Unit energy consumption of ethylene (kg standard oil/t ethylene) | 504.6 | 504.7 | 520.0 |
| Annual operation cost (10,000 CNY/ 10,000 tons of ethylene) | Baseline-24.7 | Baseline-24.4 | Baseline |

As can be seen from the data in Table 4, in Comparative Example 3 implemented using the same cracking feedstocks as those in Examples 5 and 6, the amount of generated super high pressure steam and the viscosity of quench oil are respectively 524.0 t/hr and 7.066 CP, the unit energy consumption of ethylene is 520.0 kg standard oil per ton ethylene. On the other hand, in Examples 5 and 6 implemented using the inventive process, the amounts of generated super high pressure steam are respectively 544.1 t/hr and 543.9 t/hr, and the viscosities of quench oil are respectively 0.673 CP and 0.675 CP, the unit energy consumptions of ethylene are respectively 504.6 and 504.7 kg standard oil per ton ethylene, meaning that Examples 5 and 6 realize a reduction in annual operation cost of 247,000 CNY/10,000 tons of ethylene and 244,000 CNY/10,000 tons of ethylene, respectively.

It can be seen from the comparison of the above data that, the traditional process without using the inventive process involves a lower amount of generated super high pressure steam and a higher viscosity of quench oil. In contrast, the inventive process leads to a higher amount of generated super high pressure steam and a lower viscosity of the quench oil and further realize about 15 kg standard oil/ton ethylene reduction in the unit energy consumption of ethylene and about 240,000 CNY/10,000 tons of ethylene reduction in annual operation cost, demonstrating that the inventive process contributes to highly efficient heat recovery from cracked gas and a lower viscosity of quench oil, as well as energy saving, consumption reduction and stable operation of the ethylene plant.

Example 7

Figure 7:
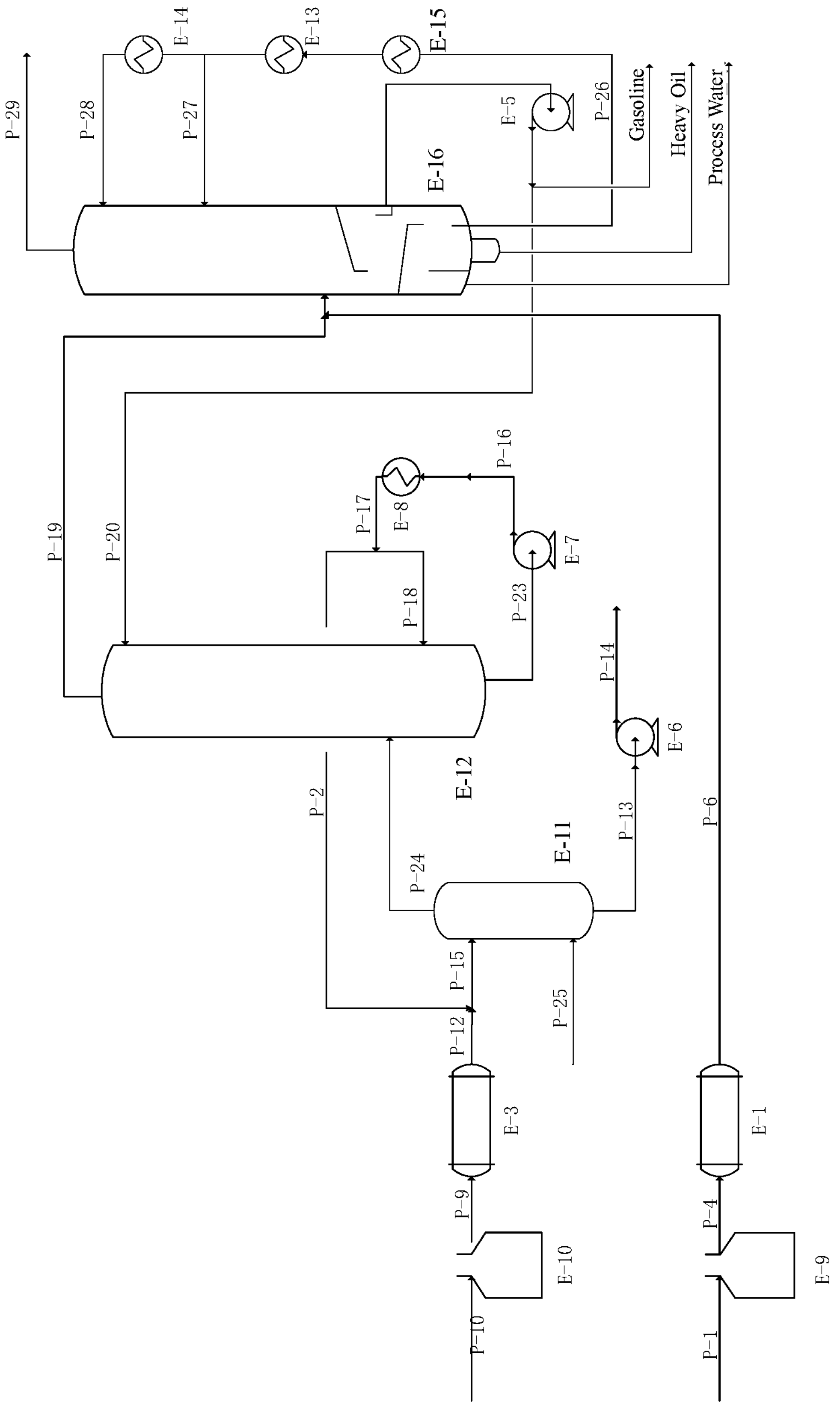
FIG. 7 is a flowchart of the seventh embodiment of the invention for recovering heat from cracked gas.

Example 7 is carried out with the device and process flow for recovering heat from cracked gas as shown in FIG. 7.

The device comprises a heat recovery device for liquid feedstock cracked gas E-3, a heat recovery device for gaseous feedstock cracked gas E-1, a heavy component removal column E-11, a gasoline fractionating column E-12 and a quench water column E-16.

The heat recovery device for liquid feedstock cracked gas E-3 is connected to the discharge port of the liquid feedstock cracker E-10, and the feed port of the liquid feedstock cracker E-10 is connected with a pipeline for liquid feedstock.

The heat recovery device for gaseous feedstock cracked gas E-1 is connected to the discharge port of the gaseous feedstock cracker E-9, and the feed port of the gaseous feedstock cracker E-9 is connected with a pipeline for gaseous feedstock.

The heavy component removal column E-11 is configured with a discharge pipeline at the top of the heavy component removal column and a discharge pipeline for liquid-solid heavy component fuel oil at the bottom of the heavy component removal column, and is connected to the gasoline fractionating column E-12 via the discharge pipeline at the top of the heavy component removal column.

The discharge pipeline of the heat recovery device for liquid feedstock cracked gas E-3 is connected to the heavy component removal column E-11, and the discharge pipeline of the heat recovery device for gaseous feedstock cracked gas E-1 is connected to the quench water column E-16.

The gasoline fractionating column E-12 is configured with a discharge pipeline for gas phase at the top and a discharge pipeline for quench oil at the bottom, wherein the discharge pipeline for gas phase at the top connects the gasoline fractionating column E-12 to the quench water column E-16, and the discharge pipeline for quench oil is connected in succession with the quench oil pump E-7 and the quench oil heat recovery device E-8, and then divided into two branches, with one branch connected to the gasoline fractionating column E-12 and the other branch connected to the discharge pipeline of the heat recovery device for liquid feedstock cracked gas E-3.

The quench water column E-16 is configured with a discharge pipeline at the top of quench water column, an extraction pipeline for heavy oil at the bottom of quench water column, an extraction pipeline for gasoline at the bottom of quench water column, a discharge pipeline for process water and a discharge pipeline for quench water.

The extraction pipeline for gasoline is configured at a higher position at the bottom of the quench water column E-16, and is connected to the reflux gasoline pump E-5 and then divided into two branches, with one branch connected to the top of the gasoline fractionating column E-12 and the other branch connected to a downstream stripping device.

The quench water discharge pipeline is connected to the quench water heat recovery device E-15 and the first quench water cooler E-13, and then divided into two branches, with one branch connected to the middle part of the quench water column E-16, and the other branch connected with the second quench water cooler E-14 and then to the top of the quench water column E-16.

The heavy component removal column E-11 is configured with a distributor, with a feed pipeline for steam configured at the lower part. The gasoline fractionating column E-12 is configured with tray internals.

The heat recovery process for cracked gas implemented by using the above device is described as follows:

The liquid feedstock P-10 is cracked in the liquid feedstock cracker E-10 to obtain the liquid feedstock cracked gas P-9. The liquid feedstock cracked gas P-9 is supplied to the heat recovery device for liquid feedstock cracked gas E-3 and is cooled to 410° C., to obtain the liquid feedstock cracked gas after heat recovery P-12, which is mixed with the quench oil P-2 for further cooled to 280° C. and then supplied to the heavy component removal column E-11.

In the heavy component removal column E-11, the gas in the liquid feedstock cracked gas mixed with quench oil P-15 is separated from the liquid and solid particles, and the separated liquid heavy component fuel oil P-13 carrying with solid particles is extracted from the bottom of the heavy component removal column E-11 by the liquid heavy component fuel oil pump E-6 configured at the column bottom, as the discharged liquid heavy component fuel oil P-14; while the separated gas phase enters the gasoline fractionating column E-12 for further cooling. Some components condense into liquid quench oil. The quench oil P-23 from the bottom of gasoline fractionating column E-12 is extracted by the quench oil pump E-7 and subjected to heat recovered in the quench oil heat recovery device E-8. A part of quench oil after heat recovery P-17 is returned to gasoline fractionating column E-12, and the other part is used as quench oil P-2 to be mixed with the liquid feedstock cracked gas after heat recovery P-12 and then supplied to the heavy component removal column E-11.

The gaseous feedstock P-1 is cracked in the gaseous feedstock cracker E-9 to obtain the gaseous feedstock cracked gas P-4. The gaseous feedstock cracked gas P-4 is supplied to the heat recovery device for gaseous feedstock cracked gas E-1 for cooling to 143° C., and the gaseous feedstock cracked gas after heat recovery P-6 is supplied to the quench water column E-16.

The overhead cracked gas of gasoline fractionating column P-19 and the gaseous feedstock cracked gas after heat recovery P-6 are further cooled by mixing with quench water in the quench water column E-16. The overhead cracked gas of quench water column P-29 is discharged from the discharge pipeline at the top of the quench water column, and the heavy components are condensed into gasoline that is lighter than water and heavy oil that is heavier than water. The gasoline is extracted at a higher position at the bottom of the quench water column E-16, boosted by the reflux gasoline pump E-5 and then divided into two streams, with one stream supplied to the top of the gasoline fractionating column E-12 as the reflux gasoline P-20 and the other stream supplied to a downstream stripping device. The heavy oil is extracted after oil-water separation in the sump at the bottom of the quench water column E-16, and the process water is separated from the bottom of the quench water column E-16 and supplied to a downstream dilution steam generation system. The quench water P-26 is separated from the bottom of the quench water column E-16, with the quench water after primary quench water cooler P-27 returned to the middle of the quench water column E-16 and quench water after secondary quench water cooler P-28 returned to the top of the quench water column E-16.

The heat recovery device for gaseous feedstock cracked gas E-1 and the heat recovery device for liquid feedstock cracked gas E-3 are subjected to heat recovery by generating steam, and the generated steam is at a pressure of 11.5 MpaG.

The heat recovery device for gaseous feedstock cracked gas E-1 and the heat recovery device for liquid feedstock cracked gas E-3 are multi-stage heat recovery devices in series.

Steam P-25 is introduced into the lower part of the heavy component removal column E-11 as stripping medium, and the steam is introduced at a pressure level of 1.6 MpaG.

Example 8

Figure 8:
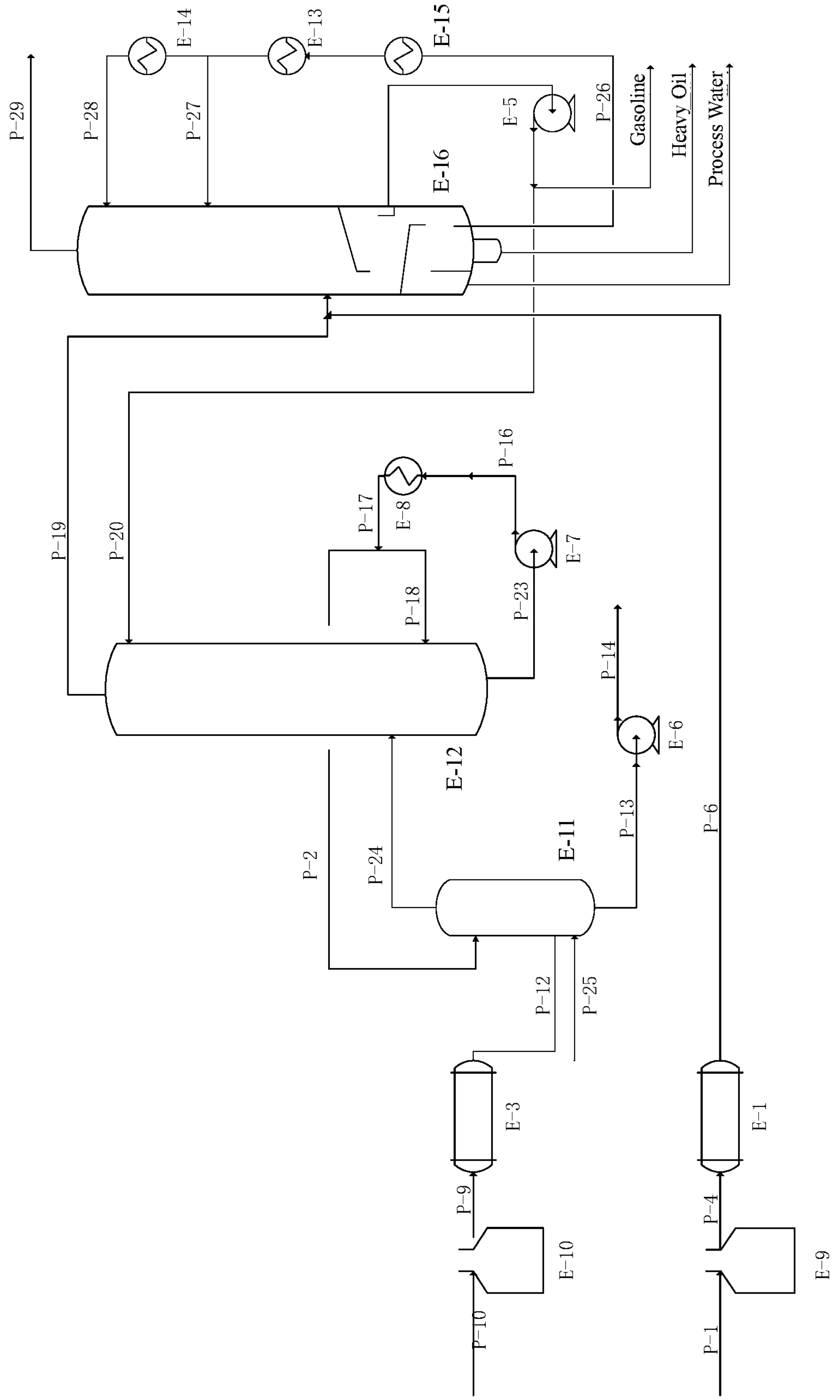
FIG. 8 is a flowchart of the eighth embodiment of the invention for recovering heat from cracked gas.

Example 8 is carried out with the device and process flow for recovering heat from cracked gas as shown in FIG. 8.

The device comprises a heat recovery device for liquid feedstock cracked gas E-3, a heat recovery device for gaseous feedstock cracked gas E-1, a heavy component removal column E-11, a gasoline fractionating column E-12 and a quench water column E-16.

The heat recovery device for liquid feedstock cracked gas E-3 is connected to the discharge port of the liquid feedstock cracker E-10, and the feed port of the liquid feedstock cracker E-10 is connected with a pipeline for liquid feedstock.

The heat recovery device for gaseous feedstock cracked gas E-1 is connected to the discharge port of the gaseous feedstock cracker E-9, and the feed port of the gaseous feedstock cracker E-9 is connected with a pipeline for gaseous feedstock.

The heavy component removal column E-11 is configured with a discharge pipeline at the top of the heavy component removal column and a discharge pipeline for liquid-solid heavy component fuel oil at the bottom of the heavy component removal column. The heavy component removal column E-11 is connected to the gasoline fractionating column E-12 via the discharge pipeline at the top of the heavy component removal column.

The discharge pipeline of the heat recovery device for liquid feedstock cracked gas E-3 is connected to the bottom of the heavy component removal column E-11, and the discharge pipeline of heat recovery device for gaseous feedstock cracked gas E-1 is connected to the quench water column E-16.

The gasoline fractionating column E-12 is configured with a discharge pipeline for gas phase at the top and a discharge pipeline for quench oil at the bottom, wherein the discharge pipeline for gas phase at the top connects the gasoline fractionating column E-12 to the quench water column E-16, and the discharge pipeline for quench oil is connected in succession with the quench oil pump E-7 and the quench oil heat recovery device E-8, and then divided into two branches, with one branch connected to the gasoline fractionating column E-12 and the other branch connected to the top of the heavy component removal column E-11.

The quench water column E-16 is configured with a discharge pipeline at the top of quench water column, an extraction pipeline for heavy oil at the bottom of quench water column, an extraction pipeline for gasoline at the bottom of quench water column, a discharge pipeline for process water and a discharge pipeline for quench water.

The extraction pipeline for gasoline is configured at a higher position at the bottom of the quench water column E-16, and is connected to the reflux gasoline pump E-5 and then divided into two branches, with one branch connected to the top of the gasoline fractionating column E-12 and the other branch connected to a downstream stripping device.

The discharge pipeline for quench water is connected to the quench water heat recovery device E-15 and the first quench water cooler E-13, and then divided into two branches, with one branch connected to the middle part of the quench water column E-16, and the other branch connected to the second quench water cooler E-14 and then to the top of the quench water column E-16.

The heavy component removal column E-11 is configured with a distributor, with a feed pipeline for steam configured at the lower part. The gasoline fractionating column E-12 is configured with tray internals.

The heat recovery process for cracked gas implemented by using the above device is described as follows:

The liquid feedstock P-10 is cracked in the liquid feedstock cracker E-10 to obtain the liquid feedstock cracked gas P-9. The liquid feedstock cracked gas P-9 is supplied to the heat recovery device for liquid feedstock cracked gas E-3 and is cooled to 410° C. to obtain the liquid feedstock cracked gas after heat recovery P-12, which is supplied to the bottom of the heavy component removal column E-11.

In the heavy component removal column E-11, the liquid feedstock cracked gas after heat recovery P-12 is further cooled to 280° C. by countercurrent contact with the quench oil P-2 from the top of the heavy component removal column E-11, and then subjected to gas-liquid separation. The separated liquid heavy component fuel oil P-13 carrying with solid particles is discharged by the liquid heavy component fuel oil pump E-6 configured at the column bottom, as the discharged liquid heavy component fuel oil P-14; while the separated overhead gas phase from the heavy component removal column E-11 is supplied to the gasoline fractionating column E-12 for further cooling. Some components condense into liquid quench oil. The quench oil P-23 from the bottom of the gasoline fractionating column E-12 is extracted by the quench oil pump E-7 and subjected to heat recovery in the quench oil heat recovery device E-8. A part of the quench oil after heat recovery P-17 is returned to the gasoline fractionating column E-12, and the other part is used as the quench oil P-2 to be supplied to the top of the heavy component removal column E-11.

The gaseous feedstock P-1 is cracked in the gaseous feedstock cracker E-9 to obtain the gaseous feedstock cracked gas P-4. The gaseous feedstock cracked gas P-4 is supplied to the heat recovery device for gaseous feedstock cracked gas E-1 for cooling to 143° C., and the gaseous feedstock cracked gas after heat recovery P-6 is supplied to the quench water column E-16.

The overhead cracked gas of gasoline fractionating column P-19 and the gaseous feedstock cracked gas after heat recovery P-6 are further cooled by mixing with quench water in the quench water column E-16. The overhead cracked gas of quench water column P-29 is discharged from the discharge pipeline at the top of the quench water column, and the heavy components are condensed into gasoline that is lighter than water and heavy oil that is heavier than water. The gasoline is extracted at a higher position at the bottom of the quench water column E-16, boosted by the reflux gasoline pump E-5 and then divided into two streams, with one stream supplied to the top of the gasoline fractionating column E-12 as the reflux gasoline P-20 and the other stream supplied to a downstream stripping device. The heavy oil is extracted after oil-water separation in the sump at the bottom of the quench water column E-16, and the process water is separated from the bottom of the quench water column E-16 and supplied to a downstream dilution steam generation system. The quench water P-26 is separated from the bottom of the quench water column E-16, with the quench water after primary quench water cooler P-27 returned to the middle of the quench water column E-16 and quench water after secondary quench water cooler P-28 returned to the top of the quench water column E-16.

The setting and process conditions of the heat recovery device for gaseous feedstock cracked gas E-1, the heat recovery device for liquid feedstock cracked gas E-3, and the steam P-25 introduced into the lower part of the heavy component removal column E-11 are same as those described in Example 7.

Comparative Example 4

The Comparative example 4 is implemented with a traditional process, and feedstocks same as those used in Examples 7 and 8.

The gaseous feedstock cracked gas from the cracker is cooled in a quench boiler to 420° C., mixed with a quench oil for further cooling to 275° C., and then supplied to a stripper.

A gas-liquid separation is conducted in the stripper, and the separated liquid heavy component fuel oil carrying with solid particles is obtained from the column bottom, and the overhead gas phase is supplied to the bottom of the fractionating column for further cooling.

The liquid feedstock cracked gas from the cracker is cooled in a heat recovery device to a temperature of 410° C., and then mixed with quench oil for further cooling to 200° C. before supplied to the fractionating column.

The fractionating column is configured with overhead reflux.

The cooled mixture of the liquid feedstock cracked gas and the overhead gas phase of the stripper is further cooled in the fractionating column, wherein some components condense into liquid quench oil, and the gas components are supplied to the quench water column for further cooling.

After being extracted by a pump and subjected to heat recovery, a part of the quench oil is returned to the fractionating column, and the other part is used as quench medium for mixing with the gaseous feedstock cracked gas which has been cooled to 410° C., and then returned to the fractionating column.

Table 5 lists data including viscosity of quench oil and diameter of quench oil column of Examples 7 and 8 using the inventive process and Comparative Example 4 without using the inventive process, all implemented with the same cracking feedstocks.

TABLE 5

| Item | Example 7 | Example 8 | Comparative Example 4 |
|---|---|---|---|
| Bottom temperature of gasoline fractionating column (° C.) | 195.4 | 195.3 | 195.3 |
| Viscosity of quench oil (CP) | 0.680 | 0.677 | 7.066 |
| Diameter of quench oil column (m) | 12.5 | 12.5 | 13.8 |
| Saved manufacturing cost (10,000 CNY) | Baseline-435.2 | Baseline-435.2 | Baseline |

As can be seen from the data in Table 5, in Comparative Example 4 implemented using the same cracking feedstocks as those in Examples 7 and 8, the diameter of quench oil column is 13.8 m and the viscosity of quench oil is 7.066 CP. On the other hand, in Examples 1 and 2 implemented using the inventive process, the quench oil columns are both in diameter of 12.5 m (implying about 4.352 million yuan saving in manufacturing cost of quench oil column), and the viscosities of quench oil are respectively 0.680 CP and 0.677 CP.

It can be seen from the comparison of the above data that, the traditional process without using the inventive process involves a larger diameter of quench oil column and a higher viscosity of quench oil. In contrast, in the inventive process, the diameter of quench oil column may be reduced by 1.3 m. The diameter reduced to 12.5 m meets the transportation requirements, and the manufacturing cost can be reduced by 4.352 million yuan (excluding transportation cost), and meanwhile the viscosity of quench oil is lower. The above data show that the process of the invention can effectively reduce the diameter of quench oil column and lower the viscosity of quench oil, contributing to the safe and stable operation of the ethylene plant and the reduction of the manufacturing and transportation costs of a large equipment.

The invention claimed is:

1. A heat recovery apparatus for cracked gas, comprising a first heat recovery device (E-3) for recovering heat from a liquid feedstock cracked gas, a second heat recovery device (E-1) for recovering heat from a gaseous feedstock cracked gas, and a heavy component removal unit; wherein:

the first heat recovery device (E-3) is configured to be connected to a discharge port of a liquid feedstock cracker;

the second heat recovery device (E-1) is configured to be connected to a discharge port of a gaseous feedstock cracker;

the heavy component removal unit comprises at least a first part for removing colloids, asphaltenes and solid coke particles, and a second part for removing intermediate components above 205° C. by fractionation;

a discharge pipeline of the first heat recovery device (E-3) is connected to the first part of the heavy component removal unit; and a discharge pipeline of the second heat recovery device (E-1) is connected to the heavy component removal unit;

the second part of the heavy component removal unit is provided with a discharge pipeline for quench oil that is connected in succession with quench oil pump (E-7) and the quench oil heat recovery device (E-8), and then divided into a first and a second branches, and wherein the first branch is connected to the second part of the heavy component removal unit, and the second branch is connected to the discharge pipeline of the first heat recovery device (E-3) or to the first part of the heavy component removal unit.

2. The heat recovery apparatus for cracked gas according to claim 1, wherein the first part of the heavy component removal unit is a heavy component removal column (E-11), and the second part of the heavy component removal unit is a gasoline fractionating column (E-12); the heavy component removal column (E-11) is connected with the gasoline fractionating column (E-12) via a discharge pipeline at the top of the heavy component removal column; and the discharge pipeline for quench oil is provided at a bottom of the gasoline fractionating column (E-12), and a discharge pipeline for gas phase is configured at the top of the gasoline fractionating column (E-12).

3. The heat recovery apparatus for cracked gas according to claim 1, wherein the heavy component removal unit comprises a fractionating column (E-12'), the fractionating column (E-12') is divided by a partition plate into an upper part and a lower part that are in gas communication, respectively named as the lower A section and the upper B section, wherein the lower A section constitutes the first part of the heavy component removal unit, and the upper B section constitutes the second part of the heavy component removal unit; the fractionating column (E-12') is configured with a discharge pipeline for gas phase at the top and a discharge pipeline for liquid-solid phase at the bottom; and the upper B section of the fractionating column (E-12') is provided with the discharge pipeline for quench oil at the bottom.

4. The heat recovery apparatus for cracked gas according to claim 1, wherein the first part of the heavy component removal unit is configured to remove colloids, asphaltenes and solid coke particles by flash evaporation or cyclone separation.

5. The heat recovery apparatus for cracked gas according to claim 2, wherein the heavy component removal unit further comprises a quench water column (E-16), the discharge pipeline of the second heat recovery device (E-1) is connected to the quench water column (E-16); the discharge pipeline for gas phase at the top of the gasoline fractionating column (E-12) is connected to the quench water column (E-16); the quench water column (E-16) is provided with a discharge pipeline at the column top and an extraction pipeline for heavy oil and an extraction pipeline for gasoline at the column bottom.

6. The heat recovery apparatus for cracked gas according to claim 5, wherein the extraction pipeline for gasoline is configured at a higher position at the bottom of the quench water column (E-16) and, after connected with the reflux gasoline pump (E-5), is divided into two branches respectively connected to the top of the second part of the heavy oil removal unit and a downstream stripping device; and the quench water column (E-16) is further configured with a discharge pipeline for process water and a discharge pipeline for quench water, wherein the discharge pipeline for quench water is connected to at least one-stage heat recovery device and at least one-stage quench water cooler and then respectively connected to the top and middle parts of the quench water column (E-16).

7. The heat recovery apparatus for cracked gas according to claim 2, wherein the discharge pipeline of the second heat recovery device (E-1) is connected to the gasoline fractionating column (E-12).

8. The heat recovery apparatus for cracked gas according to claim 3, wherein the discharge pipeline of the second heat recovery device (E-1) is connected to the lower A section or the upper B section of the fractionating column (E-12').

9. The heat recovery apparatus for cracked gas according to claim 1, wherein the second branch is connected to the discharge pipeline of the first heat recovery device (E-3), so that the quench oil and the discharge of the first heat recovery device (E-3) are mixed in the pipeline.

10. The heat recovery apparatus for cracked gas according to claim 2, wherein the second branch is connected to the upper part of the heavy component removal column (E-11); and the discharge pipeline of the first heat recovery device (E-3) is connected to the lower part of the heavy component removal column (E-11).

11. The heat recovery apparatus for cracked gas according to claim 3, wherein the second branch is connected to the top of the lower A section of the fractionating column (E-12'); and the discharge pipeline of the first heat recovery device (E-3) is connected to the bottom of the lower A section of the fractionating column (E-12').

12. The heat recovery apparatus for cracked gas according to claim 1, wherein a coke removal device is configured in the pipeline connecting the second heat recovery device (E-1) and the heavy component removal unit; and the coke removal device is at least one member of the group consisting of a coke removal drum, a single cyclone separator and a plurality of cyclone separators.

13. The heat recovery apparatus for cracked gas according to claim 3, wherein the heavy component removal unit further comprises a quench water column (E-16), which constitutes the third part of the heavy component removal unit; the discharge pipeline of the second heat recovery device (E-1) is connected to the quench water column (E-16); the discharge pipeline for gas phase at the top of the gasoline fractionating column (E-12) or the fractionating column (E-12') is connected to the quench water column (E-16); the quench water column (E-16) is configured with a discharge pipeline at the column top and an extraction pipeline for heavy oil and an extraction pipeline for gasoline at the column bottom.

14. The heat recovery apparatus for cracked gas according to claim 13, wherein the extraction pipeline for gasoline is configured at a higher position at the bottom of the quench water column (E-16) and, after connected with the reflux gasoline pump (E-5), is divided into two branches respectively connected to the top of the second part of the heavy oil removal unit and a downstream stripping device; and the quench water column (E-16) is further configured with a discharge pipeline for process water and a discharge pipeline for quench water, wherein the discharge pipeline for quench water is connected to at least one-stage heat recovery device and at least one-stage quench water cooler and then respectively connected to the top and middle parts of the quench water column (E-16).

15. The heat recovery apparatus for cracked gas according to claim 3, wherein the heavy component removal unit further comprises a quench water column (E-16), which constitutes the third part of the heavy component removal unit; the discharge pipeline of the second heat recovery device (E-1) is connected to the quench water column (E-16); the discharge pipeline for gas phase at the top of the fractionating column (E-12') is connected to the quench water column (E-16); and the quench water column (E-16) is provided with a discharge pipeline at the column top and an extraction pipeline for heavy oil and an extraction pipeline for gasoline at the column bottom.

16. The heat recovery apparatus for cracked gas according to claim 15, wherein the extraction pipeline for gasoline is configured at a higher position at the bottom of the quench water column (E-16) and, after connected with the reflux gasoline pump (E-5), is divided into two branches respectively connected to the top of the second part of the heavy oil removal unit and a downstream stripping device; and the quench water column (E-16) is further configured with a discharge pipeline for process water and a discharge pipeline for quench water, wherein the discharge pipeline for quench water is connected to at least one-stage heat recovery device and at least one-stage quench water cooler and then respectively connected to the top and middle parts of the quench water column (E-16).

17. A heat recovery process for cracked gas, characterized in that the process comprises:

cooling a liquid feedstock cracked gas (P-9) originated from a liquid feedstock cracker (E-10) to a temperature T1 in a heat recovery device for liquid feedstock cracked gas (E-3), to obtain a liquid feedstock cracked gas after heat recovery (P-12), which then is supplied to a first part of a heavy component removal unit for removing colloids, asphaltenes and solid coke particles;

further cooling the liquid feedstock cracked gas after heat recovery (P-12), before or after being supplied to the first part of the heavy component removal unit, to a temperature T2 by mixing with quench oil;

supplying the gas phase from the first part of the heavy component removal unit to a second part of the heavy component removal unit to remove intermediate components above 205° C. by fractionation, and extracting a liquid heavy component fuel oil (P-13) carrying with solid particles from the first part of the heavy component removal unit, so as to remove heavy components from the liquid feedstock cracked gas;

cooling a gaseous feedstock cracked gas (P-4) originated from a gaseous feedstock cracker (E-9) to a temperature T3 in a heat recovery device for gaseous feedstock cracked gas (E-1), and supplying the gaseous feedstock cracked gas after heat recovery (P-6, P-11) to the heavy component removal unit;

further cooling the overhead gas phase from the first part of the heavy component removal unit and the gaseous feedstock cracked gas after heat recovery (P-6, P-11) in the second part of the heavy component removal unit, wherein some components condense into liquid quench oil, and extracting the quench oil (P-23) at the bottom of the second part of the heavy component removal unit by a quench oil pump (E-7) and subjected to heat recovery in the quench oil heat recovery device (E-8); the quench oil after heat recovery (P-17) is divided into two streams, wherein the first quench oil stream (P-18) is returned to the second part of the heavy component removal unit, and the second quench oil stream (P-2) is mixed with the liquid feedstock cracked gas after heat recovery (P-12); uncondensed components are the overhead gas phase (P-19) of the second part of the heavy component removal unit.

18. The heat recovery process for cracked gas according to claim 17, wherein the heavy component removal unit comprises a heavy component removal column (E-11) and a gasoline fractionating column (E-12), the heavy component removal column (E-11) constitutes the first part of the heavy component removal unit, and the gasoline fractionating column (E-12) constitutes the second part of the heavy component removal unit; the overhead gas phase of the heavy component removal column (E-11) is supplied to the gasoline fractionating column (E-12) for further cooling, and the liquid heavy component fuel oil (P-13) carrying with solid particles is extracted from the bottom of the heavy component removal column (E-11).

19. The heat recovery process for cracked gas according to claim 17, wherein the heavy component removal unit comprises a fractionating column (E-12'), the fractionating column (E-12') is divided by a partition plate into an upper part and a lower part in gas communication, respectively named as the lower A section and the upper B section, wherein the lower A section constitutes the first part of the heavy component removal unit, and the upper B section constitutes the second part of the heavy component removal unit; the gas phase separated from the lower A section of the fractionating column (E-12') passes through the partition plate and enters the upper B section of the fractionating column (E-12') for further cooling, and the liquid heavy component fuel oil (P-13) carrying with solid particles is extracted from the bottom of the lower A section of the fractionating column (E-12').

20. The heat recovery process for cracked gas according to claim 17, wherein the first part of the heavy component removal unit removes colloids, asphaltenes and solid coke particles by flash evaporation or cyclone separation.

21. The heat recovery process for cracked gas according to claim 18, wherein the gaseous feedstock cracked gas after heat recovery (P-6) is supplied to a quench water column (E-16) which constitutes a third part of the heavy component removal unit;

overhead gas phase (P-19) of the second part of the heavy component removal unit and the gaseous feedstock cracked gas after heat recovery (P-6) are further mixed and cooled with the quench water in the quench water column (E-16), with light components discharged from the column top, and heavy components condensed into gasoline that is lighter than water and heavy oil that is heavier than water.

22. The heat recovery process for cracked gas according to claim 21, wherein the gasoline is extracted at a higher position at the bottom of the quench water column (E-16), boosted by a reflux gasoline pump (E-5) and then divided into two streams, supplied respectively to the top of the second part of the heavy component removal unit as reflux gasoline (P-20), and to a downstream stripping device;

the heavy oil is extracted after oil-water separation in a sump at the bottom of quench water column (E-16);

process water is separated from the bottom of the quench water column (E-16) and supplied to a downstream dilution steam generation system;

quench water (P-26) is separated from the bottom of the quench water column (E-16), and, after a multi-stage heat recovery, returned to the top and middle parts of the quench water column (E-16).

23. The heat recovery process for cracked gas according to claim 18, wherein the gaseous feedstock cracked gas after heat recovery (P-11) is supplied to the gasoline fractionating column (E-12).

24. The heat recovery process for cracked gas according to claim 19, wherein the gaseous feedstock cracked gas after heat recovery (P-11) is directly supplied to the upper B section of the fractionating column (E-12'), or is firstly supplied to the lower A section of the fractionating column (E-12') and then to the upper B section through the partition plate.

25. The heat recovery process for cracked gas according to claim 17, wherein the mixing of the second quench oil stream (P-2) with the liquid feedstock cracked gas after heat recovery (P-12) occurs in the pipeline.

26. The heat recovery process for cracked gas according to claim 18, wherein the liquid feedstock cracked gas after heat recovery (P-12) is supplied to the bottom of the heavy component removal column (E-11), and the second quench oil stream (P-2) is supplied to the top of the heavy component removal column (E-11); the liquid feedstock cracked gas after heat recovery (P-12) is in countercurrent contact with the second quench oil stream (P-2) in the heavy component removal column (E-11), so that the liquid feedstock cracked gas after heat recovery (P-12) is cooled to T2 and then supplied to the bottom of the gasoline fractionating column (E-12).

27. The heat recovery process for cracked gas according to claim 19, wherein the liquid feedstock cracked gas after heat recovery (P-12) is supplied to the bottom of the lower A section of the fractionating column (E-12'), and the second quench oil stream (P-2) is supplied to the top of the lower A section of the fractionating column (E-12'); the liquid feedstock cracked gas after heat recovery (P-12) is in countercurrent contact with the second quench oil stream (P-2) in the lower A section of the fractionating column (E-12'), so that the liquid feedstock cracked gas after heat recovery (P-12) is further cooled to T2, and then supplied to the bottom of the upper B section of the fractionating column (E-11).

28. The heat recovery process for cracked gas according to claim 17, wherein the temperature T1 is controlled to be not lower than the dew point, preferably, the range of T1 is 300-500° C.;

the temperature T2 is controlled to 200-350° C., preferably 250-280° C.;

the temperature T3 is controlled to be not lower than the dew point, preferably, the range of T3 is 160-240° C.

29. The heat recovery process for cracked gas according to claim 17, wherein the heat recovery device for gaseous feedstock cracked gas (E-1) and the heat recovery device for liquid feedstock cracked gas (E-3) conduct heat recovery by generating steam, wherein the generated steam has a pressure in the range of 3.5-13.0 MpaG, preferably 10.0-12.0 MpaG;

the heat recovery device for gaseous feedstock cracked gas (E-1) and the heat recovery device for liquid feedstock cracked gas (E-3) are each independently a one-stage heat recovery device, multi-stage heat recovery devices in series, or multi-stage heat recovery devices in parallel.

30. The heat recovery process for cracked gas according to claim 17, wherein the liquid feedstock cracked gas (P-9) is obtained by cracking the liquid feedstock (P-10) in the liquid feedstock cracker (E-10), wherein the liquid feedstock (P-10) is selected from one or more of C5 and higher light hydrocarbons, naphtha, gas oil and hydrogenated tail oil;

the gaseous feedstock cracked gas (P-4) is obtained by cracking the gaseous feedstock (P-1) in the gaseous feedstock cracker (E-9), wherein the gaseous feedstock (P-1) is selected from one or more of ethane, propane, butane, refinery dry gas and LPG.

* * * * *